United States Patent [19]

Isashi

[11] Patent Number: 5,719,799
[45] Date of Patent: Feb. 17, 1998

[54] PORTABLE INFORMATION PROCESSING APPARATUS

[75] Inventor: Yasuo Isashi, Sagamihara, Japan

[73] Assignee: Olympus Optical Co., Ltd., Tokyo, Japan

[21] Appl. No.: 467,754

[22] Filed: Jun. 6, 1995

[30] Foreign Application Priority Data

Jul. 7, 1994 [JP] Japan .................. 6-155564

[51] Int. Cl.⁶ .................................... G06F 00/00
[52] U.S. Cl. .................. 364/705.01; 348/552; 348/207; 348/158; 364/514 A
[58] Field of Search .............. 364/705.01, 705.05, 364/708.1, 449, 514, 708, 900; 354/412; 360/55; 361/681, 682, 683, 680; 348/207, 552, 231

[56] References Cited

U.S. PATENT DOCUMENTS

| | | | |
|---|---|---|---|
| 4,120,038 | 10/1978 | Stieringer | 364/705 |
| 5,442,512 | 8/1995 | Bradbury | 361/683 |
| 5,475,441 | 12/1995 | Parulski et al. | 348/552 |
| 5,488,558 | 1/1996 | Ohki | 364/449 |

FOREIGN PATENT DOCUMENTS

| | | |
|---|---|---|
| 6-15316 | 4/1994 | Japan . |
| 7-3735 | 1/1995 | Japan . |

*Primary Examiner*—Reba I. Elmore
*Assistant Examiner*—Monica Lewis
*Attorney, Agent, or Firm*—Frishauf, Holtz, Goodman, Langer & Chick

[57] ABSTRACT

A portable information processing apparatus includes a first member provided with an information display unit and a second member provided with an information input unit. The first member has an outer surface for exposing the information display unit, and the second member has an outer surface for exposing the information input unit. A hinge member connects the first and second members with each other so that the first and second members are pivotable between: (i) a portable position in which the first and second members overlap such that the outer surface of the first member and the outer surface of the second member oppose each other, and (ii) an open position in which the outer surface of the first member and the outer surface of the second member are moved away from each other. An angle detector detects at least one of an angle of substantially 180° and 360° between the first and second members while the first and second members are rotated in the open position. A photographing unit can perform a photographing operation when the angle detector detects at least one of 180° and 360° between the first and second members. The information display unit provided in the first member includes a display for displaying photographic image information obtained by the photographing unit. The information input unit provided in the second member includes at least one of: (i) a photographic conditions setting device for setting various photographing conditions of the photographing unit, and (ii) a shutter release device for controlling a shutter of the photographing unit.

23 Claims, 7 Drawing Sheets

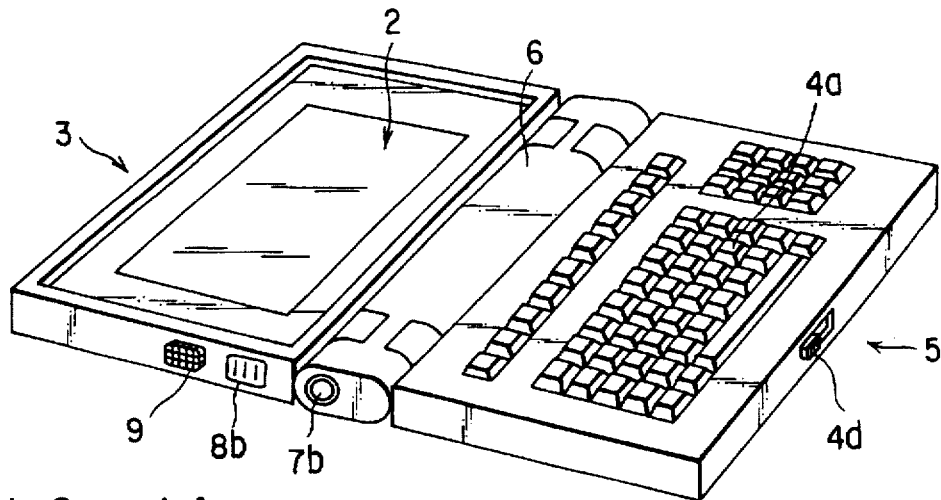
FIG. 1A
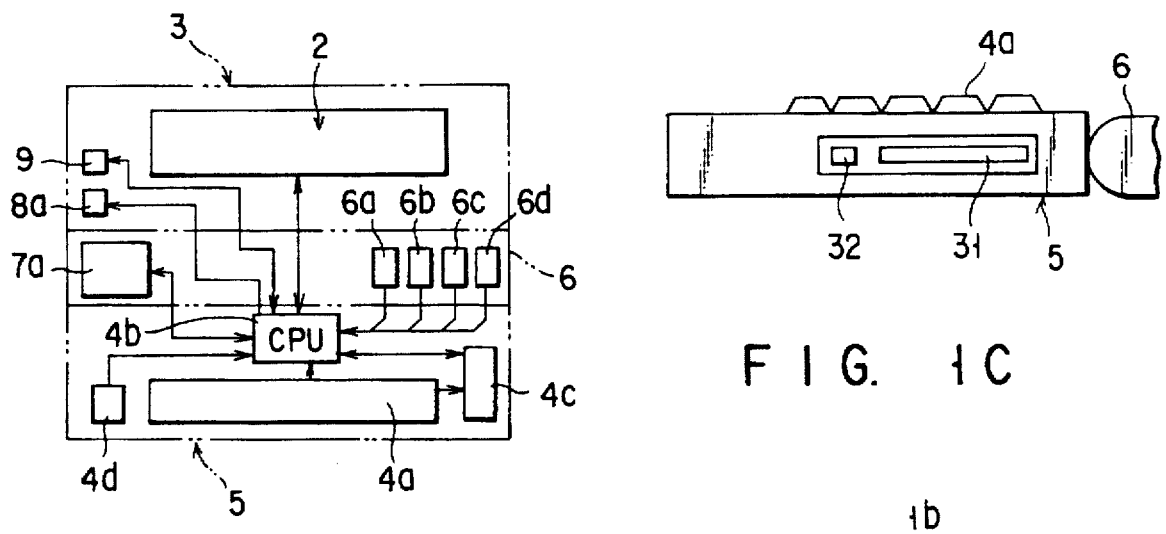
FIG. 1B
FIG. 1C
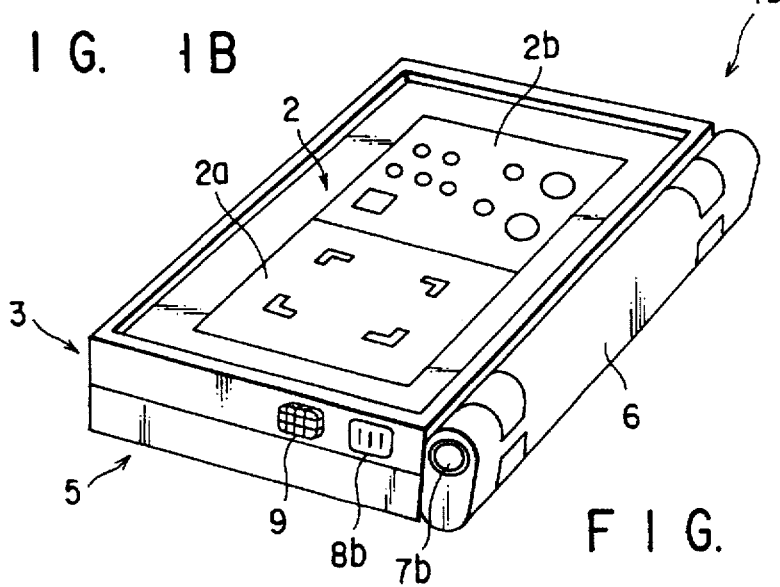
FIG. 2

1

PORTABLE INFORMATION PROCESSING APPARATUS

BACKGROUND OF THE INVENTION

1. Field of the Invention

The present invention relates to a portable information processing apparatus.

2. Description of the Related Art

In recent years, portable information processing apparatuses including a notebook personal computer (having a standard pocket book size), a subnotebook size personal computer (having a size smaller than the ordinary notebook size), an electronic notebook (having a standard pocketbook size or palm size), and the like have become known well. The information processing ability and the packing density of these portable information processing apparatuses are increasing year by year, and the number of functions of these portable information processing apparatuses is also increasing.

Very small sized portable information processing apparatuses such as the above described subnote type personal computer, the electronic pocketbook, and the like, each having a function for treating image information, have also been developed. Further, an information processing apparatus which processes image information inputted therein as digital data and which also has a photographing function portion for performing photographing, has also been proposed.

Japanese Utility Model Application KOKOKU publication No. 6-15316 (published on Apr. 20, 1994) discloses an apparatus entitled an electronic memorandum having a photographing apparatus. This apparatus has a light collecting device for collecting light on an imaging surface of a charge coupled device, with the collecting device being arranged at a position near to a liquid crystal display surface of an electronic memorandum (electronic pocketbook). The Japanese Utility Model Application KOKOKU publication No. 6-15316, however, does not disclose features such as how an operating portion for setting a photographing action mode in the apparatus is constructed and how a user may recognize whether or not the photographing action mode is set.

In electronic still cameras, which are essentially apparatuses for photographing, miniaturization and multi-functioning have progressed, and electronic still cameras with a reproducing device for reproducing an image after it is photographed have been proposed.

Japanese Utility Model Application KOKOKU publication No. 7-3735 (published on Jan. 30, 1995) discloses an apparatus entitled a camera with a reproducing apparatus. This apparatus, like an electronic pocketbook, has a hinge portion and two portions which are rotatable around the hinge portion so that the two portions can be opened and closed with respect to each other. The two portions are constructed by a housing divided into two portions of a display device portion and a recording/reproducing portion. In this apparatus, a photographing can be performed through a photographing window provided on one end surface side of the hinge portion when the display device portion is pivoted to a closed position at which the display device portion overlaps the recording/reproducing device, and a reproduction of a recorded image can be performed through a reproducing display of the display device portion when the display device portion is pivoted to move away from an upper surface of the recording/reproducing portion so that the display device and the recording/reproducing device are arranged at a right angle with respect to one another. A limit switch for detecting whether the display device portion and the recording/reproducing portion are in an open state or in the closed state is provided. When the open state is detected, this electronic still camera automatically changes its action mode to a reproducing action mode. The apparatus disclosed in the Japanese Utility Model Application KOKOKU publication No. 7-3735, however, does not respond to a recent strong desire for an electronic still camera for photographing and reproducing a recorded image which has various information processing functions and a photo-graphing function and which has a superior operability.

SUMMARY OF THE INVENTION

According to the present invention, there is provided a portable information processing apparatus which comprises a first member, a second member, and a hinge member.

The first member is provided with an information display unit and has an outer surface in which the information display unit is exposed. The second member is provided with an information input unit and has an outer surface in which the information input unit is exposed. The hinge member pivotally connects the first and second members with each other so that the first and second members can be pivotable between a portable position, where the first and second members overlap each other while the outer surface of the first member exposing the information display unit and the outer surface of the second member exposing the information input unit oppose each other, and an open position, where the outer surfaces of the first and second members are moved away from each other to separate the first and second members from each other.

The apparatus of the present invention further comprises an angle detector for detecting an angle of substantially 180° or 360° between the first and second members while the first and second members are rotated in the open position, and a photographing unit which can perform photographing when the angle of substantially 180° or 360° between the first and second members is detected by the angle detector.

In this aspect, the portable information processing apparatus of the present invention is essentially distinct from the above described conventional electronic still camera (Japanese Utility Model Application KOKOKU publication No. 7-3735).

In particular, the photographing unit of the present invention can perform photographing when the angle of substantially 180° or 360° between the first and second members is detected by the angle detector. This feature is not disclosed in the Japanese Utility Model Application KOKOKU publication No. 7-3735.

In the above described aspect of the present invention, the photographing unit can be provided in the hinge member, and the first or second member can be provided with a microphone.

When the first member is provided with an electronic flash, the second member can be provided with an information processing unit.

Alternatively, when the first member is provided with an information processing unit, the second member can be provided with an electronic flash.

In the above described aspect of the present invention, the photographing unit is provided in the first member. In this case, the second member may be provided with a microphone.

In a case that the photographing unit is provided in the first member and the electronic flash is provided in the second member, the photographing unit and the electronic flash can be arranged such that they are most close to each other when the first and second members are located at the portable portion or the 360° open position in which the angle between the first and second members is 360°, and are most moved away from each other when the first and second members are located at a 180° open position in which the angle between the first and second members is 180°.

The first member can further be provided with an information processing unit.

When the photographing unit is provided in the first member, the photographing unit can be exposed at an end surface of the first member which is located opposite to a connecting portion of the first member to the hinge member.

When the second member is provided with the photographing unit, the first member can be provided with the microphone.

In a case that the first member is further provided with an electronic flash, the photographing unit and the electronic flash can be arranged such that they are most close to each other when the first and second members are located at the portable position or the 360° open position in which the angle between the first and second members is 360°, and are moved away from each other when the first and second members are located at a 180° open position in which the angle between the first and second member is 180°.

In this case, the second member can be provided with an information processing unit.

In the above described aspect, the second member can be provided with an information processing unit.

In the above described aspect, the information storage unit can be provided with an information storage medium part through which an independent information storage medium can be inserted into the information storage unit or be removed out therefrom.

In the above described aspect, the hinge member can be provided with a first holding member by which the apparatus can be easily held by a palm of a user while the photographing unit is enable to perform photographing.

In this case, the first holding member can be constructed to have a shape that increases a friction between fingers of the user and the first holding member when the user holds the information processing apparatus by its fingers.

Further, the first holding member includes a palm-held strap which prevents the palm of the user from removing away from the outer surface of the information processing apparatus when the user holds the apparatus by its fingers.

In the above described aspect, the first member can be provided with a second holding member by which the apparatus can be easily held by a hand of the user while the photographing unit is enable to perform photographing.

Further, the second member can be provided with a third holding member by which the apparatus can be easily held by the hand of the user while the photographing unit is enable to perform photographing.

According to another aspect of the present invention, there is provided a portable information processing apparatus which also comprises the first member, the second member, and the hinge member which are the same as those of the first aspect. The another aspect of the present invention further comprises a photographing unit, and an exposed portion protecting member for protecting an exposed portion of the information input unit when the information processing apparatus is placed on a plain surface while the outer surface of the second member is faced to the plain surface.

In this another aspect of the present invention, the exposed portion protecting member can have a plurality of protecting projections which project from a region of the outer surface of the second member surrounding the exposed portion and height of each of which is larger than that of the exposed portion of the information input unit.

In this case, the first member can have a plurality of depressed portions at positions of the outer surface thereof which correspond to the plurality of the protecting projections of the outer surface of the second member when the first and second member are located at the portable position, the depressed portions being able to receive the protecting projections of the second member.

In the above described another aspect of the present invention, the exposed portion protecting member can be constructed by projecting more than the exposed portion of the information input unit from the outer surface of the second member at its region surrounding the exposed portion of the information input unit but excepting an access portion to the exposed portion.

Alternatively, the exposed portion protecting member can be constructed by setting the connecting portion of the hinge member to the second member higher than the second member including the exposed portion of the information input unit.

According to still another aspect of the present invention, there is provided a portable information processing apparatus which comprises an information display unit, a photographing unit, a recognizing portion for recognizing a reception of a predetermined detection signal which correspond to an operation for setting an action mode of the apparatus to a photographing mode, and a display circuit for displaying a pattern which functions as an operation panel for operating the photographing unit, on the exposed portion of the information display unit when the recognizing portion recognizes the photographing mode.

In this still another aspect of the present invention, the information storage unit can be provided with an information storage medium part through which an independent information storage medium can be inserted into the information storage unit or be removed out therefrom.

According to still further aspect of the present invention, there is provided a portable information processing apparatus which comprises an information display unit, a photographing unit, a recognizing portion for recognizing a reception of a predetermined detection signal which correspond to an operation for setting an action mode of the apparatus to a photographing mode, and a track ball operating member being able to operate the photographing unit when the recognizing portion recognizes the photographing mode.

In this still further aspect of the present invention, the track ball operating member is constructed to be able to indicate a position at which the photographing unit focusing its focusing point in the exposed portion of the information display unit while the photographing mode is set.

According to still another aspect of the present invention, there is provided a portable information processing apparatus which comprises an information display unit, an information input unit including a plurality of operation keys, a photographing unit, a recognizing portion for recognizing a reception of a predetermined detection signal which corresponds to an operation for setting an action mode of the apparatus to a photographing mode, and function setting means for setting predetermined ones in a plurality of operation keys of the information input unit as photographing operation input keys when the recognizing portion recognizes the photographing mode.

In this still another aspect of the present invention, the information storage unit can also be provided with an information storage medium part through which an independent information storage medium can be inserted into the information storage unit or be removed out therefrom.

According to still another aspect of the present invention, there is provided a portable information processing apparatus which also comprises the first member, the second member, and the hinge member which are the same as those of the first aspect. This still another aspect of the present invention further comprises a photographing unit mounted in the hinge member, and an optical extending member optically connected to the photographing unit, projecting from the hinge member in a direction crossing rotational outer lines between the hinge member and the first and second members, and orientating its optical axis in the direction.

In this still another aspect of the present invention, the optical extending member can be provided at its extending end with a microphone.

According to an aspect of the present invention, there is provided a portable information processing apparatus comprising: a first member provided with an information display unit and having an outer surface in which the information display unit is exposed; a second member provided with an information input unit and having an outer surface in which the information input unit is exposed; a hinge member pivotally connecting the first and second members with each other so that the first and second members can be pivotable between a portable position, where the first and second members overlap each other while the outer surface of the first member exposing the information display unit and the outer surface of the second member exposing the information input unit oppose each other, and an open position, where the outer surface of the first member and the outer surface of the second member are moved away from each other to separate the first and second members from each other; and a photographing unit, provided in one of the first member, the second member, and the hinge member, and enabled to perform photographing at least when the first and second members are pivoted by one of substantially 180° and 360° with respect to each other at the open position.

With this arrangement, the user of the portable information processing apparatus can determine, at a glance, whether the portable information processing apparatus is set in the photographic mode utilizing an image sent from the photographing unit at any specific open position or the normal mode not utilizing an image sent from the photographing unit. Therefore, the user of the portable information processing apparatus does not miss a so-called shutter chance when he is to utilize an image sent from the photographing unit, and can easily hold and operate the portable information processing apparatus.

In the information processing apparatus having this arrangement, it is preferable that the exposed portion of the information input unit on the outer surface of the second member project from the outer surface, and the information processing apparatus further comprise an exposed portion protecting member for protecting the exposed portion of the information input unit from being brought into contact with the flat surface when the information processing apparatus is placed on the flat surface such that the outer surface of the second member faces the flat surface.

The exposed portion protecting member can have a plurality of protecting projections projecting from a region of the outer surface of the second member which surrounds the exposed portion and having a height larger than that of the exposed portion of the information input unit on the outer surface of the second member. When the information processing apparatus is placed on the flat surface such that the outer surface of the second member faces the flat surface, the projecting ends of the plurality of protecting projections are abutted against the flat surface, thereby preventing the exposed portion of the information input unit from being brought into contact with the flat surface.

When the exposed portion protecting member has the plurality of protecting projections, as described above, the first member preferably has a plurality of recessed portions at positions on the outer surface thereof exposing the information display unit which correspond to the plurality of protecting projections of the outer surface of the second member, for receiving the plurality of protecting projections on the outer surface of the second member when the first and second members are arranged at the portable position.

With this arrangement, when the first and second members are arranged at the portable position, the plurality of protecting projections will not project from the information processing apparatus into the outer space, and the information processing apparatus can be carried easily.

The exposed portion protecting member can also be obtained by forming a region of the outer surface of the second member which surrounds the exposed portion of the information input unit so as to project higher than the exposed portion from the outer surface except for an access portion to the exposed portion. When the information processing apparatus is placed on the flat surface such that the outer surface of the second member faces the flat surface, the projecting end of the surrounding region of the outer surface is abutted against the flat surface, thereby preventing the exposed portion of the information input unit from being brought into contact with the flat surface. When compared to the plurality of protecting projections described above, the surrounding region projecting from the outer surface of the second member allows the second member to be placed on the flat surface more stably when the information processing apparatus is placed on the flat surface such that the outer surface of the second member faces the flat surface.

The exposed portion protecting member can also be obtained by setting the height of the connecting portion of the hinge member with the second member to be larger than the height of the second member including the exposed portion of the information input unit.

In the portable information processing apparatus having the above arrangement according to one aspect of the present invention, when the photographing unit is enabled to perform photographing, the exposed portion of the information display unit of the first member preferably displays an image photographed by the photographing unit and an operation panel used for operating the photographing unit.

With this arrangement, when the photographing unit is enabled to perform photographing, an independent display unit used for displaying an image photographed by the photographing unit is not necessary, and the operation of the photographing unit becomes easy.

If the image photographed by the photographing unit is displayed on the exposed portion of the information display unit of the first member when the photographing unit is enabled to perform photographing, as described above, the information input unit preferably includes a track ball and/or a click member provided to the second member. It is preferable that this track ball and/or the click member be arranged within a range of the second member which is capable of being accessed by a user's finger when the photographing unit is enabled to perform photographing and the information processing apparatus is held by the user, thereby allowing operation of the photographing unit.

Even when the information processing apparatus is used in the normal mode not utilizing the image sent from the photographing unit, or in the photographic mode utilizing such an image, input to the information apparatus can be easily performed by using the track ball and/or the click member.

It is more convenient if the track ball and/or the click member can designate a position on an image displayed on the exposed portion of the information display unit, on which the photographing unit must be focused, when the photographing unit is enabled to perform photographing.

The portable information processing apparatus having the above arrangement according to one aspect of the present invention further comprises an electronic flash arranged at a position of one of the first and second members which is far from the hinge member. The photographing unit can be arranged at a position of the other one of the first and second members which is far from the hinge member. If the electronic flash and the photographing unit are arranged in this manner, when the first and second members are arranged at a closed position or a 360°-pivot or rotate position, the electronic flash and the photographing unit are most close to each other, and when the first and second members are arranged at a 180°-pivot or rotate position, the electronic flash and the photographing unit are most moved away from each other.

When the electronic flash and the photographing unit come closest to each other, it is convenient for so-called closeup photographing. When the electronic flash and the photographing unit are moved apart farthest from each other, a so-called pink-eye effect can be effectively prevented.

The portable information processing apparatus having the above arrangement according to one aspect of the present invention can further comprise an electronic flash and an information processing unit. In this case, it is preferable that the electronic flash be arranged at one of the first and second members, and the information processing unit be arranged at the other one of the first and second members.

With this arrangement, electrical noise generated when the electronic flash emits light can be effectively prevented from adversely affecting the information processing unit.

The portable information processing apparatus having the above arrangement according to one aspect of the present invention can further comprises a microphone in one of the first and second members. In this case, it is preferable that the photographing unit be arranged in the hinge member or the other one of the first and second members.

With this arrangement, noise generated when the photographing unit operates can be effectively prevented from being picked up by the microphone.

In the portable information processing apparatus having the above arrangement according to one aspect of the present invention, when the first and second members are compared with the hinge member, the internal spaces of the first and second members are larger than that of the hinge member. Thus, the information processing apparatus can further comprise an information storage unit in one of the first and second members.

When the information processing apparatus further comprises the information storage unit in one of the first and second members, one of the first and second members can be provided with an information storage medium port which enables attachment and detachment of an independent information storage medium in and from the information storage unit. Since the internal spaces of the first and second members are larger than that of the hinge member, when the information storage medium port is provided to one of the first and second members and not to the hinge member, the structure of the information storage medium port can be made simple.

In the portable information processing apparatus having the above arrangement according to one aspect of the present invention, at least one of the first member, the second member, and the hinge member is preferably provided with a holding member which facilitates holding of the information processing apparatus by the hands of a user for the information processing apparatus when the photographing unit is enabled to perform photographing.

This holding member can be formed to have a shape to fit with fingers of the hands of the user, when the user holds the information processing apparatus with the fingers of the hands, thereby increasing friction with the fingers. Also, or alternatively, the holding member can include a palm-held strap which suppresses the palm of the user from separating from the outer surface of the information processing apparatus when the user holds the information processing apparatus with the fingers of the hands, thereby holding the information processing apparatus.

In order to achieve the object of the present invention described above, according to another aspect of the present invention, there is provided a portable information processing apparatus comprising: a first member provided with an information display unit and having an outer surface in which the information display unit is exposed; a second member provided with an information input unit and having an outer surface in which the information input unit; a hinge member pivotally connecting the first and second members with each other so that the first and second members can be pivotable between a portable position, where the first and second members overlap each other while the outer surface of the first member exposing the information display unit and the outer surface of the second member exposing the information input unit oppose each other, and an open position, where the outer surface of the first member and the outer surface of the second member are moved away from each other to separate the first and second members from each other; a photographing unit provided to one of the first member, the second member, and the hinge member; and a photographing unit operating member, arranged in a region of an outer surface of one of the first member, the second member, and the hinge member, which is exposed to an outer space when the first and second members are arranged at the portable position, for operating the photographing unit.

When the apparatus comprises the photographing unit operating member arranged in the above manner, the photographing unit can be conveniently operated even while the first and second members are arranged at the portable position. More specifically, when this apparatus is compared with the portable information processing apparatus according to one aspect of the present invention described above, while the first and second members are arranged at the portable position, they need not be pivoted from the portable position to a 180°- or 360°-open position for enabling the photographing unit to perform photographing. Thus, a so-called shutter chance will not be missed.

In the portable information processing apparatus having the above arrangement according to another aspect of the present invention, it is preferable that the photographing unit be provided to the hinge member and have an optical viewfinder in the hinge member.

When such an optical viewfinder is employed to observe an image photographed by the photographing unit while the first and second members are arranged at the portable position, the arrangement of the photographing unit can be made compact, and thus the outer size of the portable information processing apparatus can be made small.

Even in the portable information processing apparatus having the above arrangement according to another aspect of the present invention, the photographing unit can be enabled to perform photographing at least when the first and second members are pivoted by one of substantially 180° and 360° with respect to each other at the open position. In this manner, if the photographing unit can perform photographing even when the first and second members are at the 180°- and/or 360°-pivot position, the portable information processing apparatus which is in use in the normal mode can be easily changed to the photographic mode. The information display unit of the first member or the information input unit of the second member exposed to the outer space can be used as an operating member for the photographing unit. Also, the information display unit can display an image photographed in the photographic mode.

The portable information processing apparatus having the above arrangement according to another aspect of the present invention can also comprise an electronic flash in one of the first and second members, and an information processing unit in the other one of the first and second members. In this case, as in the portable information processing apparatus having the above arrangement according to one aspect of the present invention, it is preferable that the electronic flash be arranged in one of the first and second members, and the information processing unit be arranged in the other one of the first and second members.

The reason why this arrangement is preferable is the same as that for the portable information processing apparatus described above according to one aspect of the present invention. That is, electrical noise generated when the electronic flash emits light can be effectively prevented from adversely affecting the information processing unit.

As in the portable information processing apparatus having the above arrangement according to one aspect of the present invention, the portable information processing apparatus having the above arrangement according to another aspect of the present invention can further comprise a microphone in one of the first and second members. The photographing unit is preferably arranged in one of the hinge member and the other one of the first and second members.

With this arrangement, as in the portable information processing apparatus having the above arrangement according to one aspect of the present invention, noise generated when the photographing unit operates can be effectively prevented from being picked up by the microphone.

As in the portable information processing apparatus having the above arrangement according to one aspect of the present invention, in the portable information processing apparatus having the above arrangement according to another aspect of the present invention, when each of the first and second members is compared with the hinge member, the internal space of each of the first and second members is larger than that of the hinge member. Thus, the information processing apparatus can further comprise an information storage unit in one of the first and second members.

If the information processing apparatus further comprises an information storage unit in one of the first and second members, one of the first and second member can be provided with an information storage medium port which enables attachment and detachment of an independent information storage medium in and from the information storage unit. Since the internal space of each of the first and second members is larger than that of the hinge member, when the information storage medium port is provided to one of the first and second members and not to the hinge member, the structure of the information storage medium port can be made simple.

As in the portable information processing apparatus having the above arrangement according to one aspect of the present invention, in the portable information processing apparatus having the above arrangement according to another aspect of the present invention, at least one of the first member, the second member, and the hinge member is preferably provided with a holding member which facilitates holding of the information processing apparatus by the hands of the user for the information processing apparatus when the photographing unit is enabled to perform photographing.

As in the portable information processing apparatus having the above arrangement according to one aspect of the present invention, this holding member can be formed to have a shape to fit with the fingers of the predetermined hand of the user when the user holds the information processing apparatus with the fingers of the predetermined hand, thereby increasing friction with the fingers. Also, or alternatively, the holding member can include a palm-held strap which suppresses the palm of the user from separating from the outer surface of the information processing apparatus when the user holds the information processing apparatus with the fingers of the hands, thereby holding the information processing apparatus.

In order to achieve the object of the present invention described above, according to still another aspect of the present invention, there is provided a portable information processing apparatus comprising: a first member provided with an information display unit and having an outer surface in which the information display unit is exposed; a second member provided with an information input unit and having an outer surface in which the information input unit is exposed; a hinge member pivotally connecting the first and second members so that the first and second members can be pivotable between a portable position, where the first and second members overlap each other while the outer surface of the first member exposing the information display unit and the outer surface of the second member exposing the information input unit oppose each other, and an open position, where the outer surface of the first member and the outer surface of the second member are moved away from each other to separate the first and second members from each other; a photographing unit arranged at a position of one of the first and second members which is far from the hinge member; and an electronic flash arranged at a position of the other one of the first and second members which is far from the hinge member, wherein when the first and second members are arranged at a closed position or a 360°-open position, the electronic flash and the photographing unit are closest to each other, and when the first and second members are arranged at a 180°-open position, the electronic flash and the photographing unit are farthest from each other.

If the electronic flash and the photographing unit are arranged in this manner, when they are moved closest to each other, as in a preferable example of the portable information processing apparatus described above according to one aspect of the present invention, it is convenient for so-called closeup photographing. When the electronic flash and the photographing unit are moved away farthest from each other, a so-called pink-eye effect can be effectively prevented.

In order to achieve the object of the present invention described above, according to still another object of the present invention, there is provided a portable information processing apparatus comprising: a first member provided with an information display unit and having an outer surface in which the information display unit is exposed; a second member provided with an information input unit and having an outer surface in which the information input unit is exposed; a hinge member pivotally connecting the first and second members so that the first and second members can be pivotable between a portable position, where the first and second members overlap each other while the outer surface of the first member exposing the information display unit and the outer surface of the second member exposing the information input unit oppose each other, and an open position, where the outer surface of the first member and the outer surface of the second member are moved away from each other to separate the first and second members from each other; a photographing unit provided to one of the first member, the second member, and the hinge member; an electronic flash provided to one of the first and second members; and an information processing unit provided to the other one of the first and second members.

If the portable information processing apparatus comprises not only the photographing unit but also the electronic flash for the photographing unit, and further the information processing unit, as in another preferable example of the portable information processing apparatus described above according to one aspect of the present invention, when the electronic flash is provided to one of the first and second members and the information processing unit is provided to the other one of the first and second members, electrical noise generated when the electrical flash emits light can be effectively prevented from adversely affecting the information processing unit.

In order to achieve the object of the present invention described above, according to still another aspect of the present invention which is different from the one immediately described above, there is provided a portable information processing apparatus comprising: a first member provided with an information display unit and having an outer surface in which the information display unit is exposed; a second member provided with an information input unit and having an outer surface in which the information input unit is exposed; a hinge member pivotally connecting the first and second members so that the first and second members can be pivotable between a portable position, where the first and second members overlap each other while the outer surface of the first member exposing the information display unit and the outer surface of the second member exposing the information input unit oppose each other, and an open position, where the outer surface of the first member and the outer surface of the second member are moved away from each other to separate the first and second members from each other; a microphone provided to one of the first and second members; and a photographing unit provided to the hinge member or the other one of the first and second members.

If the portable information processing apparatus comprises the microphone, in addition to the photographing unit, as described above, as in an example of the portable information processing apparatus described above according to one aspect of the present invention, when the microphone is provided to one of the first and second members and the photographing unit is provided to the hinge member or the other one of the first and second members, noise generated when the photographing unit operates can be effectively prevented from being picked up by the microphone.

In order to achieve the object of the present invention, according to still another aspect of the present invention which is further different from the one immediately described above, there is provided portable information processing apparatus comprising: a first member provided with an information display unit and having an outer surface in which the information display unit is exposed; a second member provided with an information input unit and having an outer surface in which the information input unit is exposed; a hinge member pivotally connecting the first and second members so that the first and second members can be pivotable between a portable position, where the first and second members overlap each other while the outer surface of the first member exposing the information display unit and the outer surface of the second member exposing the information input unit oppose each other, and an open position, where the outer surface of the first member and the outer surface of the second member are moved away from each other to separate the first and second members from each other; a photographing unit provided to the hinge member; and an optical extending member, optically connected to the photographing unit, projecting from the hinge member in a direction intersecting with rotation center lines between the hinge member and the first member and between the hinge member and the second member, and having a mirror optical system having an optical axis extending in the direction.

With this arrangement, while the first and second members are arranged at the open position, when the optical axis of the mirror optical system at the projecting end of the optical extending member is set in substantially the same direction as that in which the exposed portion of the information display unit of the first member is set, the face of the user of the portable information processing apparatus facing the information display unit can be photographed by the photographing unit through the mirror optical system without substantially degrading the image, and the face of the user photographed by the photographing unit can be displayed on the exposed portion of the information display unit. When this portable information processing apparatus is combined with a telephone set, it can be used as a picture telephone as well.

The optical extending member can comprise a microphone at its extending end. With this arrangement, the user of the portable information processing apparatus can record his or her own voice while observing the image displayed on the exposed portion of the information display unit.

In order to achieve the object of the present invention described above, according to still another aspect of the present invention which is still further different from the one immediately described above, there is provided a portable information processing apparatus comprising: a first member provided with an information display unit and having an outer surface in which the information display unit is exposed; a second member provided with an information input unit and having an outer surface in which the information input unit is exposed; a hinge member pivotally connecting the first and second members so that the first and second members can be pivotable between a portable position, where the first and second members overlap each other while the outer surface of the first member exposing the information display unit and the outer surface of the second member exposing the information input unit oppose each other, and an open position, where the outer surface of the first member and the outer surface of the second member are moved away from each other to separate the first and second members from each other; and a photographing unit incorporated in the first member and exposed on an end surface of the first member which is on an opposite side to the connecting portion of the first member with the hinge member.

With this arrangement, while the first and second members are arranged at the open position, the user of the portable information processing apparatus can observe, on the information display unit, an image being photographed by the photographing unit of the first member as the user opposes the exposed portion of the information display unit of the first member and the exposed portion of the information input unit of the second member. Furthermore, the image displayed on the information display unit can be processed by the portable information processing apparatus through the information input unit in various manners.

In the portable information processing apparatus having this arrangement, the information storage unit can be provided in the second member without increasing the outer size of the second member and thus the outer size of the information storage unit, when compared to a case wherein the information storage unit is provided in the hinge member which has a more complicated arrangement and thus tends to have a smaller outer size than the first or second member and to a case wherein the information storage unit is provided in the first member in which the information display unit and the photographing unit are provided so that the first member does not have an enough space. Also, the second member can be provided with an information storage medium port for enabling attachment and detachment of an independent information storage medium in and from the information storage unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1A is a perspective view showing the outer appearance of a portable information processing apparatus according to one embodiment of the present invention;

FIG. 1B is a block diagram schematically showing the internal structure of the portable information processing apparatus shown in FIG. 1A;

FIG. 1C is a rear view showing an information storage medium port in the rear end surface of a second member of the portable information processing apparatus shown in FIG. 1A, where a keyboard is provided in the second member;

FIG. 2 is a perspective view showing the outer appearance of another embodiment of the portable information processing apparatus of this invention;

DETAILED DESCRIPTION OF THE PREFERRED EMBODIMENTS

Figure 3:
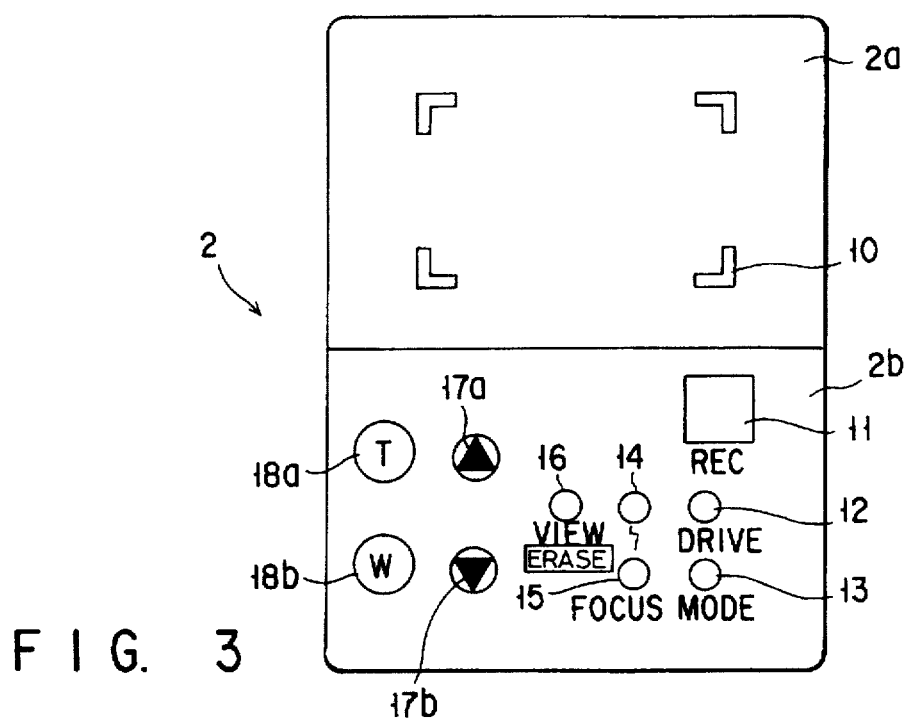
FIG. 3 is an enlarged view of a screen of a liquid crystal information display in another embodiment shown in FIG. 2.

Various embodiments of a portable information processing apparatus according to the present invention will be described in detail with reference to the accompanying drawings.

FIG. 1A is a perspective view schematically showing the outer appearance of a subnotebook size personal computer as a portable information processing apparatus according to a first embodiment of the present invention. FIG. 1B is a block diagram schematically showing the internal structure of the subnotebook size personal computer shown in FIG. 1A. FIG. 1C is a side view showing one longitudinal end surface of the subnotebook size personal computer shown in FIG. 1A.

Referring to FIG. 1A, reference numeral 1a denotes the outer appearance of the subnotebook size personal computer as the portable information processing apparatus according to the first embodiment of the present invention. The subnotebook size personal computer 1a has a first flat square member 3, a second flat square member 5, and a hinge member 6. A liquid crystal display unit 2 serving as an information display unit is provided in the first member 3, and the first member 3 has one side surface in which the screen of the liquid crystal display unit 2 is exposed. A keyboard 4a serving as an information input unit is provided in the second member 5, and the second member 5 has one side surface in which a plurality of keys of the keyboard 4a are exposed. The hinge member 6 pivotally connects one lateral end portion of the first member 3 and one lateral end portion of the second member 5 which corresponds to the one lateral end portion of the first member 3. The rotational center line between the hinge member 6 and the first member 3 and the rotational center line between the hinge member 6 and the second member 5 are separated in parallel to each other.

As shown in FIG. 1B, an information processing unit 4b, such as a CPU, and an information storage unit 4c which uses a detachable independent information storage medium, such as a PC card (Personal Computer Card), are incorporated in the second member 5, in addition to the keyboard 4a. Further, in the second member 5, a mode change switch 4d is provided for changing a normal mode in which the computer is used as a normal information processing apparatus with a photographing mode in which the computer is used as a camera, and vice versa.

As shown in FIG. 1C, the information storage unit 4c includes an information storage medium port 31 exposed to one longitudinal end surface (rear end surface in FIG. 1A) of the second member 5. An eject button 32 is arranged in the vicinity of the information storage medium port 31 to eject an information storage medium (not shown), loaded in the information storage unit 4c through the information storage medium port 31, from the information storage unit 4c.

The hinge member 6 incorporates a photographing unit 7a having a photographic optical system and a charge coupled device (not shown) for converting optical image formed on the device by the optical system to electrical data image. A lens 7b of the photographic optical system and a lens barrier (not shown) for selectively covering the lens 7b are arranged at a longitudinal end surface of the hinge member 6 that faces in a direction (the front end surface in FIG. 1A) opposite to the one longitudinal end surface of the second member 5 where the information storage medium port 31 is formed.

An electronic flash window 8b of an electronic flash 8a (see FIG. 1B) is arranged, adjacent to the lens 7b of the hinge member 6, at a longitudinal end surface (the front end surface in FIG. 1A) of the first member 3 corresponding to the longitudinal end surface of the hinge member 6 where the lens 7b is arranged. A microphone 9 is arranged adjacent to the electronic flash window 8b.

The hinge member 6 is further provided with angle detector 6a, 6b (see FIG. 1B) which detect an angle of 180° between the first member 3 and the second member 5 when the first and second members 3, 4 are arranged as shown in FIG. 1A. The lens barrier (not shown) exposes the lens 7b only when the angle detector 6a, 6b detect the above described angle between the first and second members 3, 4.

The operation of the subnotebook size personal computer 1a according to the first embodiment which has the above arrangement will be described.

When the subnotebook size personal computer 1a is carried or is not used, its first member 3 and the second member 5 are closed to an overlapping portable position so that the screen of the liquid crystal display unit 2 and the plurality of keys of the keyboard 4a oppose each other.

When the subnotebook size personal computer 1a is used in a normal mode in which the computer does not use image information sent from the photographing unit 7a, the first member 3 and the second member 5 are pivoted away from each other in a range between 90° or more and less than 180° (excluding 180°) from the portable position such that they are separated away from each other, thereby exposing the screen of the liquid crystal display unit 2 and the plurality of keys of the keyboard 4a simultaneously. When the subnotebook size personal computer 1a is carried or is not used, and is used in the normal mode, the lens barrier (not shown) covers the lens 7b.

When the subnotebook size personal computer 1a is used in a photographic mode in which the computer uses image information sent from the photographing unit 7a, the first member 3 and the second member 5 are pivoted away from each other by up to an angle of 180°, as shown in FIG. 1A, and the lens barrier (not shown) is operated by the angle detectors 6a, 6b (see FIG. 1B) to expose the lens 7b in the manner as described above. When the angle detectors 6a, 6b detect the above described predetermined angle, the recording portion included in the information processing unit 4b (see FIG. 1B) incorporated in the subnotebook size personal computer 1a recognizes predetermined angle detection signals from the angle detectors 6a, 6b, and the information processing sets, on the basis of the recognition, the subnotebook size personal computer 1a in a photographic mode, so that the subnotebook size personal computer 1a serves as a camera.

When the subnotebook size personal computer 1a is set in the photographic mode, a plurality of predetermined keys of the keyboard 4a of the second member 5 serve as photographing condition setting buttons for setting various photographing conditions, and another one predetermined key serves as a shutter release button. Image information input in the photographing unit 7a through the lens 7b is displayed on the screen of the liquid crystal display unit 2 of the first member 3, and the screen of the liquid crystal display unit 2 serves as a viewfinder of a conventional camera.

While the subnotebook size personal computer 1a is set in the photographic mode, the photographic optical system (not shown) automatically focuses on an object displayed at the center of the screen of the liquid crystal display unit 2, and automatically adjusts exposure. At this time, when one predetermined key of the keyboard 4a serving as the shutter release button is depressed, the image information input in the photographing unit 7a through the lens 7b is stored in the information storage unit 4c of the subnotebook size personal computer 1a. The information storage unit 4c can be additionally connected to an external information storage unit (not shown) which is independent of the subnotebook size personal computer 1a.

While the subnotebook size personal computer 1a is set in the photographic mode, keys of the keyboard 4a, other than the plurality of predetermined keys and one predetermined key described above, are not associated with photographing. Even if each of keys other than the plurality of predetermined keys and one predetermined key described above is depressed, the photographing conditions set by the plurality of predetermined keys described above do not change, or the image information input in the photographing unit 7a (see FIG. 1B) through the lens 7b is not stored in the information storage unit 4c.

While the subnotebook size personal computer 1a is set in the photographic mode, when a voice input mode is set by the keyboard 4a voice can be stored in the information storage unit 4c through the microphone 9.

Concerning the opening/closing of the lens barrier (not shown), a lens barrier opening/closing selection switch may be independently provided on the outer surface of the first member 3 or the outer surface of the second member 5, and the lens barrier may be opened/closed by operating the lens barrier opening/closing selection switch. Alternatively, the lens barrier may be opened/closed by operating a predetermined key of the keyboard 4a in a predetermined manner.

According to the subnotebook size personal computer 1a of the first embodiment which has the above arrangement and operates in the above described manner, the user of the subnotebook size personal computer 1a can discriminate, at a glance, whether the subnotebook size personal computer 1a is currently set in the normal mode or the photographic mode, only by checking the open angle between the first member 3 and the second member 5.

Since the first member 3 and the second member 5 of the subnotebook size personal computer 1a can be opened/ closed quickly, the user will not miss a shutter chance.

Since the plurality of predetermined keys and one predetermined key of the keyboard 4a can be used for operating the photographing unit 7a (see FIG. 1B), an independent switch or switches for operating the photographing unit 7a is or are not necessary. Though the photographing unit 7a is added to the subnotebook size personal computer 1a, the entire outer size of the subnotebook size personal computer 1a will not be increased, or the structure of the subnotebook size personal computer 1a will not be complicated.

Since the information processing unit 4b is incorporated in the second member 5 and the electronic flash 8a is provided to the first member 3 independent of the second member 5 through the hinge member 6, the information processing unit 4b will be effectively prevented from being adversely affected by electrical noise which is generated when the electronic flash 8a emits light.

Since the microphone 9 is provided in the first member 3, the photographing unit 7a is incorporated in the hinge member 6, and the keyboard 4a is provided to the second member 5, noise which is generated when the photographing unit 7a drives the photographic optical system (not shown) or noise which is generated when any one of the plurality of keys of the keyboard 4a is depressed is prevented from being stored in the information storage unit 4c through the microphone 9.

The portable information processing apparatus according to the present invention is not limited to the subnotebook size personal computer 1a but can be a notebook size personal computer or an electronic pocketbook.

FIG. 2 is a perspective view schematically showing the outer appearance of a subnotebook size personal computer according to another embodiment of the present invention. FIG. 3 is an enlarged view of the screen of the information display unit of the subnotebook size personal computer shown in FIG. 2.

The main arrangement of the embodiment shown in FIG. 2 is almost identical to the arrangement of the embodiment shown in FIG. 1. Thus, structural members of another embodiment identical to those of the embodiment of FIG. 1 are denoted by the same reference numerals as those denoting the corresponding structural members of the embodiment of FIG. 1, and detailed descriptions of these structural members will be omitted.

Referring to FIG. 2, reference numeral 1b denotes a subnotebook size personal computer according to this embodiment. The first member 3 and the second member 5 of the subnotebook size personal computer 1b of this embodiment are pivotal between a portable position and an open position through the hinge member 6. At the portable position, the first member 3 and the second member 5 are closed to overlap with each other such that the screen of the liquid crystal display unit 2 and a plurality of keys of the keyboard 4a oppose each other. At the open position, the screen of the liquid crystal display unit 2 and the plurality of keys of the keyboard 4a are set apart from each other and the first member 3 and the second member 5 are separated from each other. In this embodiment, the first member 3 and the second member 5 are pivotable between the above described portable position and the 360°-open position where they are pivoted and opened apart by 360° from each other so that the screen of the liquid crystal display unit 2 and the plurality of keys of the keyboard 4a are in the opposite directions.

When the subnotebook size personal computer 1b is used in the normal mode in which the computer does not use image information sent from the photographing unit 7a (see FIG. 1B), the first member 3 and the second member 5 are pivoted away from each other in a range between 90° or more and less than 180° (excluding 180°), thereby exposing the liquid crystal display unit 2 and the keyboard 4a simultaneously. When the subnotebook size personal computer 1b is not used or is used in the normal mode, a lens barrier (not shown) covers the lens 7b.

In this embodiment, when the subnotebook size personal computer 1b is used in the photographic mode in which the computer uses image information sent from the photographing unit 7a (see FIG. 1B), the first member 3 and the second member 5 are pivoted away from each other by 360°, as shown in FIG. 2. Angle detectors 6c, 6d (see FIG. 1B) incorporated in the hinge member 6 causes the lens barrier (not shown) to expose the lens 7b only when the first member 3 and the second member 5 are pivoted away from each other by 360°, as shown in FIG. 2. When the angle detectors 6c, 6d detect this open angle, the recognizing portion of the information processing unit 4b (see FIG. 1B) incorporated in the subnotebook size personal computer 1b recognizes predetermined angle detection signals from the angle detectors 6c, 6d, and the information processing unit 4b sets, on the basis of the recognition, the subnotebook size personal computer 1b in the photographic mode, so that the subnotebook size personal computer 1b serves as a camera.

In FIG. 3, the screen of the liquid crystal information display unit 2 when the subnotebook size personal computer 1b is set in the photographic mode is shown in an enlarged scale. When the subnotebook size personal computer is set in the photographic mode, a pattern functioning as an operation panel is displayed on the screen of the liquid crystal display unit 2 by a display circuit constituted by a corresponding portion of the information processing unit 4b and ROM in which the pattern is stored, etc. As this pattern, a substantial half 2a of the screen serving as a viewfinder displays a frame 10 indicating an in-focus area, and the remaining substantial half 2b serving as a touch operation panel displays various touch operation buttons. Therefore, image information input to the photographing unit 7a through the lens 7b is displayed on the substantial half 2a of the screen of the liquid crystal display unit 2 of the first member 3 so that this substantial half 2a serves as the viewfinder of a conventional camera, and a remaining substantial half 2b of the screen of the liquid crystal display unit 2 serves as a touch operation panel for operating the photographing unit 7a incorporated in the hinge member 6.

In the touch operation panel 2b shown in FIG. 3, reference numeral 11 denotes a recording operation button used for storing an image displayed on the viewfinder 2a in the information storage unit 4c. That is, the recording operation button 11 serves as the shutter release button of a conventional camera.

Reference numeral 12 denotes a photographic mode switching button for changing the type of the photographic mode. Every time it is depressed, the photographic mode switching button 12 switches the photographic mode in the order of "single", "self timer", "continuous shot Low", "continuous shot High", "interval photography Low", "interval photography High", and "single" photographic modes. The photographic mode currently set by the photographic mode switching button 12 is displayed at the corner of the viewfinder 2a. In the single photographic mode, every time the recording operation button 11 is operated, the image displayed then on the viewfinder 2a is stored in the information storage unit 4c (see FIG. 1B) of the second member 5. In the self timer photographic mode, the image displayed on the viewfinder 2a is stored in the information storage unit 4c when a predetermined period of time has elapsed after the recording operation button 11 is operated. In the continuous shot Low photographic mode, every time the recording operation button 11 is operated, the images displayed on the liquid crystal display unit 2 are continuously stored in the information storage unit 4c by a predetermined number of times. In the continuous shot High photographic mode, the same operation as in the continuous shot Low photographic mode occurs but at a higher speed than in the continuous shot Low photographic mode. In the interval photography Low photographic mode, while the recording operation button 11 is depressed, the images displayed on the viewfinder 2a are continuously stored in the information storage unit 4c at a predetermined time interval. In the interval photography High photographic mode, the same operation as in the interval photography Low photographic mode occurs but at a shorter predetermined time interval than the predetermined time interval of the interval photography Low photographic mode.

Reference numeral 13 denotes a storing mode switching button for switching the type of the storing mode employed when an image is to be stored in the information storage unit 4c. Every time it is depressed, the storing mode switching button 13 switches the storing mode in the order of "normal", "economy", "studio", "fine", and "normal" storing modes. The storing mode currently set by the storing mode switching button 13 is also displayed at the corner of the viewfinder 2a. The normal storing mode is a storing mode which is normally used. In the economy storing mode, the number of images that can be stored in the information storage unit 4c can be increased. The studio storing mode is used in recording an image with a high resolution at a location, such as a studio, where the photographing conditions are very good. The fine storing mode is used in recording an image with a high resolution at a location other than in a studio where the photographing conditions are very good.

Reference numeral 14 denotes an electronic flash mode switching button for switching the type of the operation mode of the electronic flash 8a (see FIG. 1B). Every time it is depressed, the electronic flash mode switching button 14 switches the electronic flash mode in the order of "automatic light emission", "forced off", "forced light emission", "slow shutter release", "external electronic flash", and "automatic light emission" modes. The electronic flash mode currently set by the electronic flash mode switching button 14 is also displayed at the corner of the viewfinder 2a. In the automatic light emission mode, when the recording operation button 11 is depressed while an exposure meter (not shown) incorporated in the photo-graphic optical system (not shown) of the photographing unit 7a (see FIG. 1B) of the hinge member 6 indicates a predetermined value or less, the electronic flash 8a automatically emits light for a predetermined period of time. In the forced off electronic flash mode, when the recording operation button 11 is depressed, light emission by the electronic flash 8a is always prohibited regardless of the measured value of the exposure meter (not shown). In the forced light emission electronic flash mode, when the recording operation button 11 is depressed, the electronic flash 8a always emits light for a predetermined period of time regardless of the measured value of the exposure meter (not shown). In the slow shutter release electronic flash mode, when the recording operation button 11 is depressed while the exposure meter (not shown) indicates the predetermined value or less, the shutter speed of a shutter mechanism (not shown) incorporated in the photographic optical system (not shown) of the photographing unit 7a is automatically lowered to a predetermined value, and the electronic flash 8a emits light for a predetermined period of time in a smaller light amount than in the automatic light emission electronic flash mode or in the forced light emission electronic flash mode. In the external electronic flash mode, when an external electronic flash independent of the subnotebook size personal computer 1b of this embodiment is connected to an external electronic flash contact (not shown) of the subnotebook size personal computer 1b and used, the external electronic flash emits light in synchronism with depression of the recording operation button 11.

Reference numeral 15 denotes an in-focus mode switching button for switching the type of in-focus mode of the photographic optical system (not shown) of the photographing unit 7a (see FIG. 1B). Every time it is depressed, the in-focus mode switching button 15 switches the in-focus mode in the order of "auto focus", "power focus", and "auto focus" modes. The in-focus mode currently set by the in-focus mode switching button 15 is also displayed at the corner of the viewfinder 2a. In the auto focus mode, the focal point of the photographic optical system (not shown) is automatically set on an object displayed on the frame 10 of the viewfinder 2a by an automatic focusing unit provided to the photographic optical system (not shown) of the photographing unit 7a. In the power focus mode, the focal point of the photographic optical system (not shown) can be set at a desired distance. This operation can be performed through an operation button (to be described later).

Reference numeral 16 denotes a play/erase operation button. Every time it is depressed, the play/erase operation button 16 switches the photographic mode in the order of play mode, erase mode, and photographic mode. In the play mode, a desired one of a plurality of images or an image already stored in the information storage unit 4c (see FIG. 1B) of the second member 5 can be selected and reproduced on the viewfinder 2a. This image selecting operation can be performed through an operation button (to be described later). In the erase mode, the image information of the image reproduced on the viewfinder 2a in the play mode can be erased from the information storage unit 4c.

Reference numerals 17a and 17b denote an UP button and a DOWN button, respectively. When the UP or DOWN button 17a or 17b is depressed in the play mode, it serves as a frame feed operation button or a frame reverse feed operation button, respectively, that are used for selecting a desired one of the plurality of images or one image already stored in the information storage unit 4c (see FIG. 1B) of the second member 5. When the UP button 17a or the DOWN button 17b is depressed in the power focus mode, it serves as a manual focus button for moving the focal point of the photographic optical system (not shown) forward or backward at a predetermined step.

Reference numerals 18a and 18b denote zooming operation buttons for performing a zooming operation of the photo-graphic optical system (not shown) of the photographing unit 7a (see FIG. 1B) of the hinge member 6. While the zooming operation button 18a with a letter T is depressed, a telescopic zooming operation is performed. While the zooming operation button 18b with a letter W is depressed, a wide-angle zooming operation is performed.

Similarly in this modification, even if any key of the keyboard 4a is depressed while the first member 3 and the second member 5 of the subnotebook size personal computer 1b are pivoted apart by 360° from each other and the subnotebook size personal computer 1b is set in the photographic mode, the various types of modes described above that are set through the touch operation panel 2b of the liquid crystal display unit 2 will not be changed.

Concerning the opening/closing of the lens barrier (not shown), a lens barrier opening/closing selection switch may be independently provided on the outer surface of the first member 3 or the outer surface of the second member 5, and the lens barrier may be opened/closed by operating the lens barrier opening/closing selection switch. Alternatively, the lens barrier may be opened/closed by operating a predetermined key of the keyboard 4a in a predetermined manner.

The touch operation panel 2b of the liquid crystal display unit 2 can be replaced by a pen input operation panel.

The subnotebook size personal computer 1b according to the second embodiment can be set in the photographic mode by the angle detectors 6a, 6b (see FIG. 1B) not only when the first member 3 and the second member 5 are at the 360°-open position where they are pivoted apart from each other by 360°, as shown in FIG. 2, but also when the first member 3 and the second member 5 are at the 180°-open position where they are pivoted apart from each other by 180°, as shown in FIG. 1.

Similarly in this embodiment described above in detail, the user of the subnotebook size personal computer 1b can discriminate, at a glance, whether the subnotebook size personal computer 1b is currently set in the normal mode or the photographic mode, only by checking the open angle of the first member 3 and the second member 5.

In the subnotebook size personal computer 1b according to this embodiment, when it is set in the photographic mode by arranging the first member 3 and the second member 5 at the 360°-open position where they are pivoted apart from each other by 360°, as shown in FIG. 2, the outer size of the subnotebook size personal computer 1b set in the photographic mode is more compact than that of the subnotebook size personal computer 1a of this embodiment which is set in the photographic mode by arranging its first member 3 and second member 5 at the 180°-open position where they are pivoted apart from each other by 180°, as shown in FIG. 1A.

In the subnotebook size personal computer 1b of this embodiment, since the touch operation panel 2b is used for selecting various types of operation programs during setting the photographic mode, selection of the operation programs for the photographic mode is easier than selection of various types of operation programs for the photographic mode by using the keyboard 4a in the subnotebook size personal computer 1a of the first embodiment described above.

In the photographic mode, the voice input mode can be set by setting a predetermined key of the keyboard 4a or the touch operation panel 2b to a touch recording button.

Figure 4:
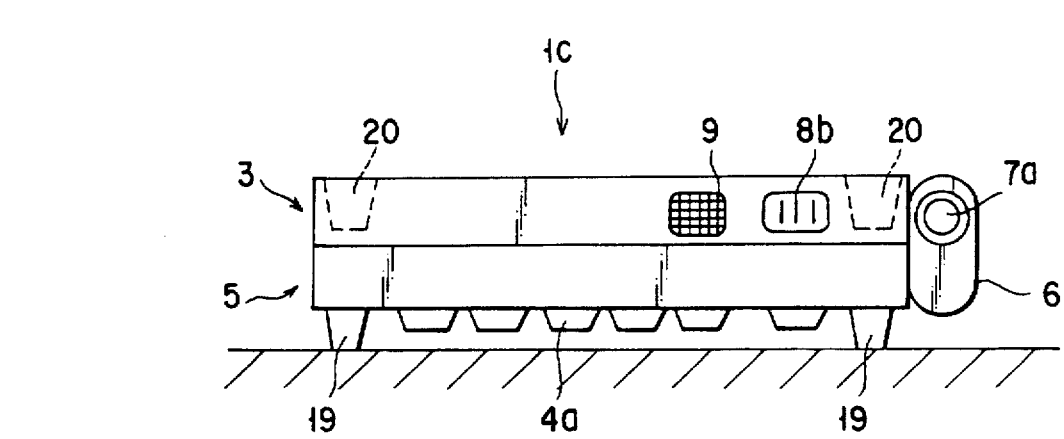
FIG. 4 is a side view of still another embodiment of the portable information processing apparatus of this invention.

FIG. 4 shows a side view of a subnotebook size personal computer as still another embodiment of the portable information processing apparatus.

The main arrangement of this embodiment is identical to the arrangement of the second embodiment shown in FIGS. 2 and 3. Thus, the structural members of this embodiment identical to those of the second embodiment are denoted by the same reference numerals as those denoting the corresponding structural members of the second embodiment, and detailed descriptions of these structural members will be omitted.

Referring to FIG. 4, reference numeral 1c denotes a subnotebook size personal computer of this embodiment. In the subnotebook size personal computer 1c of this embodiment, recessed portions 20 are formed at four corners of the side surface of the first member 3 in which the screen of the liquid crystal display unit 2 is exposed, and projections 19 are formed at four corners of the side surface of the second member 5 on which a plurality of keys of a keyboard 4a are arranged. The height of each projection 19 is the same as to each other and is larger than that of each key projecting from the keyboard 4a, as is apparent from FIG. 4.

Therefore, while the first member 3 and the second member 5 of the subnotebook size personal computer 1c of this embodiment are arranged at the 360°-open position where they are pivoted apart from each other by 360° so that the subnotebook size personal computer 1c is set in the photographic mode, when the subnotebook size personal computer 1c is placed on a flat surface, e.g., a desktop, such that its keys projecting from the keyboard 4a face the flat surface, as shown in FIG. 4, the projecting ends of the projections 19 on the side surface of the second member 5 are abutted against the flat surface, so that the keys projecting from the keyboard 4a will not be brought into contact with the flat surface. As a result, when the subnotebook size personal computer 1c of this embodiment is set in the play mode, the image reproduced on the viewfinder 2a (see FIGS. 2 and 3) can be stably observed by many people as well as by one person. Also, when an image is photographed by the photographing unit 7a of the subnotebook size personal computer 1c of this embodiment, this flat surface can be used in place of a tripod.

Furthermore, in the subnotebook size personal computer 1c of this embodiment, when the first member 3 and the second member 5 are pivoted by 360° from the 360° open position shown in FIG. 4 and are arranged at the portable position where they are closed such that the screen of the liquid crystal display unit 2 of the first member 3 and the plurality of keys of the keyboard 4a of the second member 5 oppose each other, the projections 19 at the four corners of the side surface of the second member 5 are accommodated in the recessed portions 20 at the four corners of the side surface of the first member 3. Thus, the projecting ends of the projections 19 at the four corners of the second member 5 do not abut against the side surface of the first member 3, so that the first member 3 and the second member 5 will not be prevented from being arranged at the portable position where they are closed.

As a matter of course, the subnotebook size personal computer 1c of this embodiment can also obtain the advantages described above that are obtained in the subnotebook size personal computer 1b of the second embodiment shown in FIG. 2.

Figure 5:
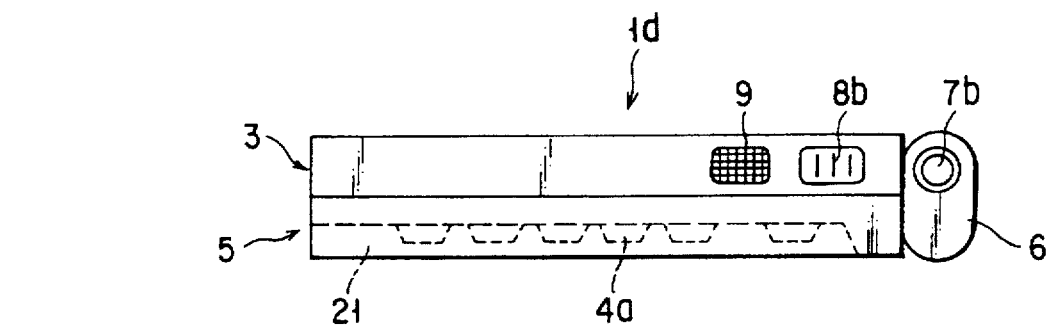
FIG. 5 is a side view of still another embodiment of the portable information processing apparatus of this invention.

FIG. 5 shows a side view of a subnotebook size personal computer as further still another embodiment of the portable information processing apparatus of this embodiment.

The main arrangement of this embodiment is identical to the arrangement of the second embodiment described with reference to FIGS. 2 and 3. Thus, the structural members of this embodiment identical to those of the second embodiment shown in FIGS. 2 and 3 are denoted by the same reference numerals as those denoting the corresponding structural members of the second embodiment, and a detailed description of these structural members will be omitted.

Referring to FIG. 5, reference numeral 1d denotes a subnotebook size personal computer of this embodiment. In the subnotebook size personal computer 1d of this embodiment, a region of one side surface of the second member 5 surrounding the plurality of keys of the keyboard 4a is higher than the plurality of keys of the keyboard 4a except for an access portion to the plurality of keys of the keyboard 4a. This surrounding region is higher than the keys projecting from the keyboard 4a, and its projecting end is flat.

Accordingly, while the first member 3 and the second member 5 of the subnotebook size personal computer 1d of this embodiment are arranged at the 360°-open position where they are pivoted apart from each other by 360° so that the subnotebook size personal computer 1d is set in the photographic mode, when the subnotebook size personal computer 1d is placed on a flat surface, e.g., a desktop, such that its keys projecting from the keyboard 4a face the flat surface, as shown in FIG. 5, the projecting end of the surrounding region of the second member 5 is abutted against the flat surface, so that the keys projecting from the keyboard 4a will not be brought into contact with the flat surface.

As a result, when the subnotebook size personal computer 1d of this embodiment is set in the play mode, the image reproduced on the viewfinder 2a (see FIGS. 2 and 3) can be stably observed by many people as well as by one person. Also, when an image is photographed by the photographing unit 7a of the subnotebook size personal computer 1d of this embodiment, this flat surface can be used as a tripod. These advantages are identical to those of the subnotebook size personal computer 1c of the third embodiment described above with reference to FIG. 4.

Similarly as in the subnotebook size personal computer 1c of FIG. 4, the subnotebook size personal computer 1d of this embodiment can also obtain the advantages described above that are obtained in the subnotebook size personal computer 1b shown in FIG. 2, as a matter of course.

Figure 6:
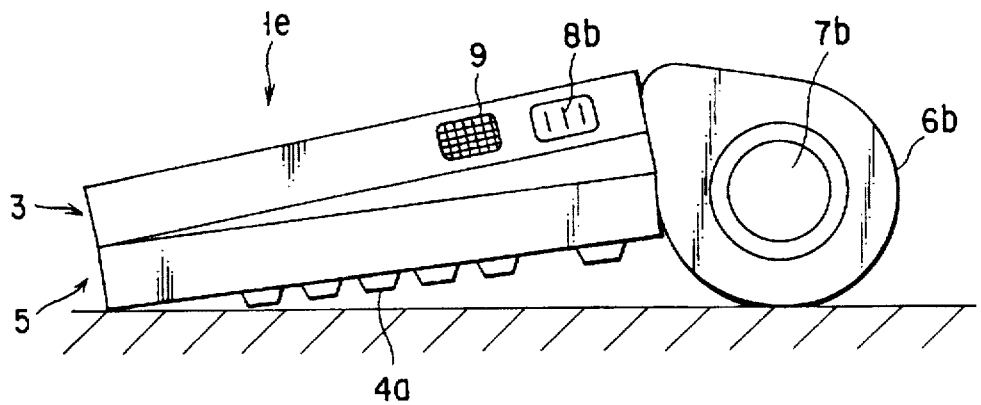
FIG. 6 is a side view of still another embodiment of the portable information processing apparatus of this invention.

FIG. 6 shows a side view of a subnotebook size personal computer as still another embodiment of the portable information processing apparatus of this embodiment.

The main arrangement of this embodiment is identical to the arrangement of the second embodiment shown in FIGS. 2 and 3. Thus, the structural members of this embodiment identical to those of the embodiment shown in FIGS. 2 and 3 denoted by the same reference numerals as those denoting the corresponding structural members of the embodiment shown in FIGS. 2 and 3, and a detailed description of these structural members will be omitted.

Referring to FIG. 6, reference numeral 1e denotes a subnotebook size personal computer of this embodiment. In the subnotebook size personal computer 1e of this embodiment, the cross section of its hinge member 6b is different from that of the hinge member 6 of the first embodiment, as is apparent from FIG. 6. More specifically, in the cross section of the hinge member 6b of the subnotebook size personal computer 1e of this embodiment, its connecting portion connected to the first member 3 provided with the liquid crystal display unit 2 (see FIGS. 2 and 3) has a diameter smaller than the thickness of the first member 3, and another connecting portion connected to the second member 5 provided with the keyboard 4a has a diameter larger than the thickness of the second member 5 including the height of the individual keys of the keyboard 4a.

Accordingly, while the first member 3 and the second member 5 of the subnotebook size personal computer 1e of this embodiment are arranged at the 360°-open position where they are pivoted apart from each other by 360° so that the subnotebook size personal computer 1e is set in the photographic mode, when the subnotebook size personal computer 1e is placed on a flat surface, e.g., a desktop, such that its keys projecting from the keyboard 4a face the flat surface, as shown in FIG. 6, the circumferential surface of the large-diameter connecting portion of the hinge member 6b is abutted against the flat surface, so that the keys projecting from the keyboard 4a will not be brought into contact with the flat surface.

As a result, when the subnotebook size personal computer 1e of this embodiment is set in the play mode, the image reproduced on the viewfinder 2a (see FIGS. 2 and 3) of the liquid crystal display unit 2 can be stably observed by many people as well as by one person. Also, when an image is photographed by the photographing unit 7a of the subnotebook size personal computer 1e of this embodiment, this flat surface can be used as a tripod. These advantages are identical to those of the subnotebook size personal computer 1c described above with reference to FIG. 4.

Similarly as in the subnotebook size personal computer 1c shown in FIG. 4, the subnotebook size personal computer 1e of this embodiment can also obtain the advantages described above that are obtained in the subnotebook size personal computer 1b of FIG. 4, as a matter of course.

Figure 7A:
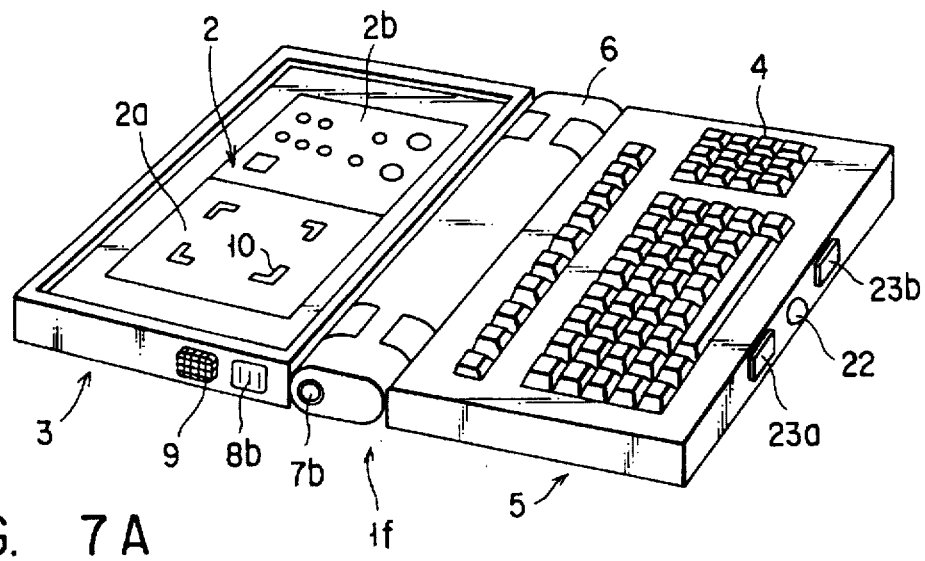
FIG. 7A is a perspective view showing still another embodiment of the portable information processing apparatus of this invention, in a state that its first and second members are arranged at a 180°-open position.
Figure 7B:
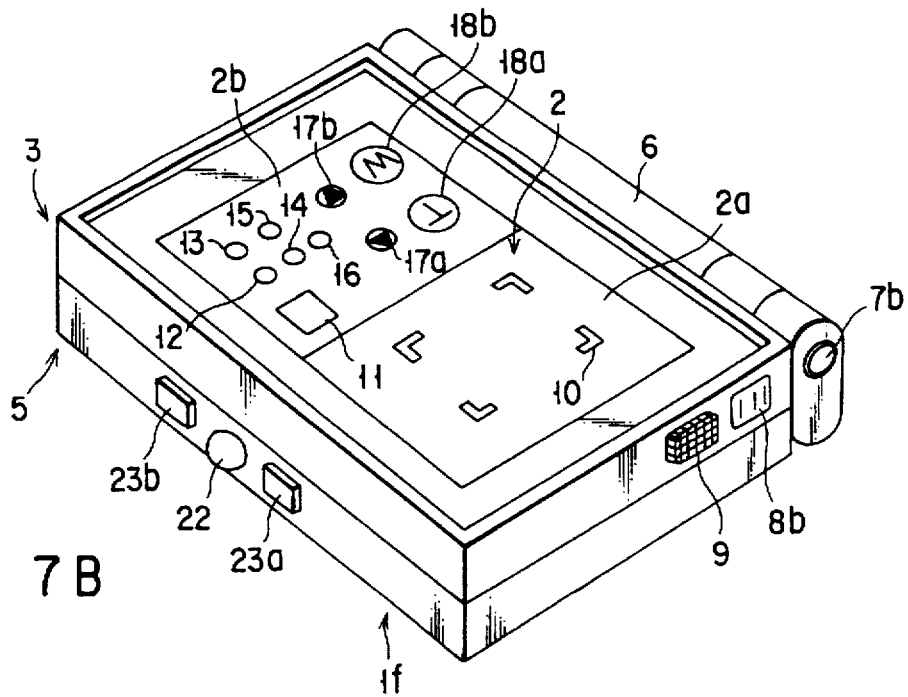
FIG. 7B is a perspective view showing still another embodiment of the portable information processing apparatus in a state that its first and second members are arranged at a 360°-open position.

FIGS. 7A and 7B are perspective views schematically showing the two states of a subnotebook size personal computer as still another embodiment of the portable information processing apparatus of this embodiment.

The main arrangement of this embodiment is identical to the arrangement of the embodiment described above with reference to FIGS. 2 and 3. Thus, the structural members of this embodiment identical to those of the embodiment of FIGS. 2 and 3 denoted by the same reference numerals as those denoting the corresponding structural members of the embodiment of FIGS. 2 and 3, and a detailed description of these structural members will be omitted.

Referring to FIGS. 7A and 7B, reference numeral 1f denotes a subnotebook size personal computer according to this embodiment. In the subnotebook size personal computer 1f of this embodiment, a track ball operating member constituted by a track ball 22 and a pair of execute and cancel click members 23a and 23b is arranged on the lateral end surface of the second member 5 opposite to the hinge member 6.

The track ball 22 and a pair of execute and cancel click members 23a and 23b can be used when the subnotebook size personal computer 1f is set in both the normal mode and the photographic mode.

When the subnotebook size personal computer 1f is used in the normal mode in which the computer 1f does not use image information sent from the photographing unit 7a (see FIG. 1B), the first member 3 and the second member 5 are pivoted apart from each other in a range between 90° or more and less than 180° (excluding 180°) to expose the screen of the liquid crystal display unit 2 and the plurality of keys of the keyboard 4a simultaneously. When the subnotebook size personal computer 1f is not used or is used in the normal mode, the lens barrier (not shown) described above covers a lens 7b.

When the subnotebook size personal computer 1f is set in the normal mode, a plurality of icons corresponding to a plurality of processing programs can be displayed on the screen of the liquid crystal display unit 2 of the first member 3 by operating a predetermined key or keys of the keyboard 4a. When a desired icon is selected by using the track ball 22 and the execute click member 23a is depressed, the subnotebook size personal computer 1f can be operated on the basis of a processing program corresponding to the desired icon. When the cancel click member 23b is depressed, execution of the processing program corresponding to the icon selected by the track ball 22 can be canceled.

When the first member 3 and the second member 5 of the subnotebook size personal computer 1f are arranged at the 180°-open position where they are pivoted apart from each other by 180° as shown in FIG. 7A, and are arranged at the 360°-open position where they are pivoted apart from each other by 360° as shown in FIG. 7B, the subnotebook size personal computer 1f can be used in the photographic mode in which the computer 1f uses image information sent from the photographing unit 7a.

When the subnotebook size personal computer 1f is set in the photographic mode, as described above, the lens barrier (not shown) is caused by the angle detectors 6a to 6d (see FIG. 1B) to expose the lens 7b, as described above.

When the subnotebook size personal computer 1f is set in the photographic mode, a plurality of icons corresponding to a plurality of processing programs concerning the photographic mode can be displayed within the viewfinder 2a of the liquid crystal display unit 2 by operating a predetermined key or keys of the keyboard 4a. When a desired icon is selected from the plurality of icons by using the track ball 22 and depressing the execute click member 23a, the subnotebook size personal computer 1f set in the photographic mode can be operated on the basis of a processing program corresponding to the desired icon.

According to some of the plurality of processing programs, when a desired region in an in-focus area 10 in the viewfinder 2a of the liquid crystal display unit 2 is designated by the track ball 22, the focal point of the optical system (not shown) of the photographing unit 7a can be set only on the desired region by depressing the execute click member 23a. When the cancel click member 23b is depressed, the desired region selected by the track ball 22 can be canceled.

According to this embodiment described above in detail, the track ball 22 can be used when the subnotebook size personal computer 1f is set in each of the normal and photographic modes, so that a desired processing program can be conveniently set easily and quickly.

The subnotebook size personal computer 1f of this embodiment can also obtain the advantages described above that are obtained in the subnotebook size personal computer 1b of FIG. 2, as a matter of course.

Figure 8A:
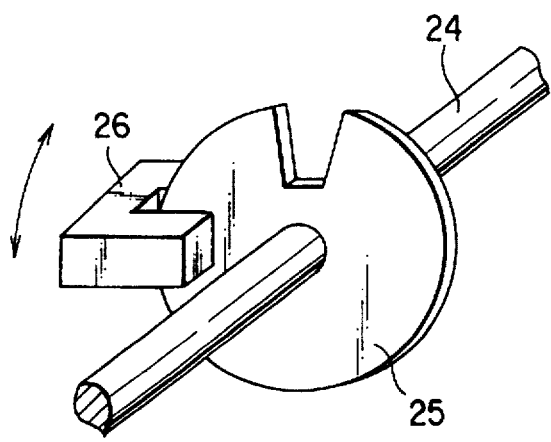
FIG. 8A is a perspective view schematically showing the structure of an angle detector which is used in the portable information processing apparatus shown in FIG. 1A.
Figure 8B:
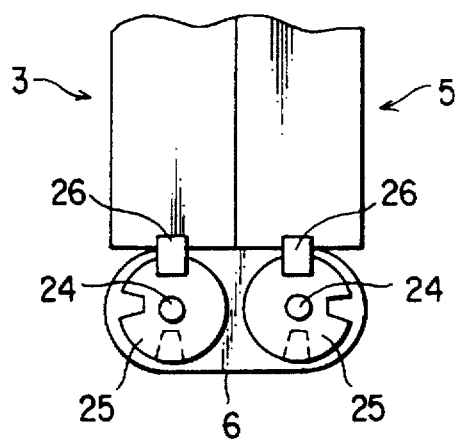
FIGS. 8B, 8C, and 8D are side views of the angle detector, where the angle between the first and second members are changed to explain the action of the angle detector.
Figure 8C:
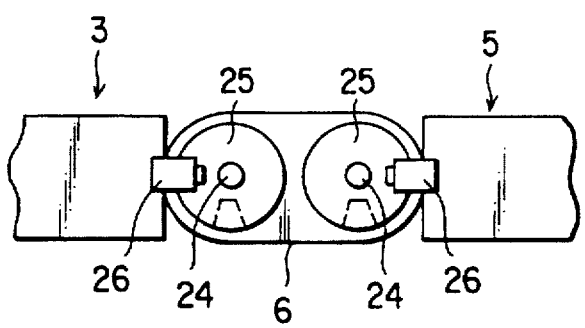
Figure 8D:
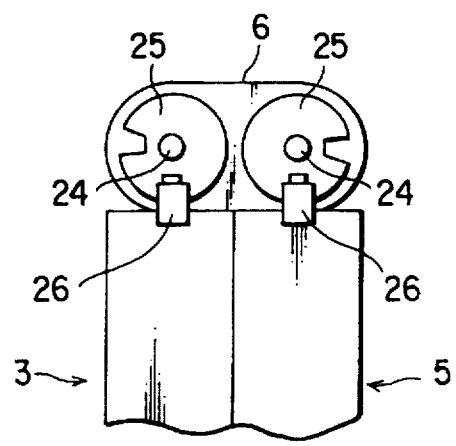

FIG. 8A is a perspective view schematically showing the structure of the angle detector which is used in the portable information processing apparatus shown in FIG. 1A. FIGS. 8B, 8C, and 8D are side views of the angle detector, where the angle between the first and second members 3 and 5 are changes to explain the action of the angle detector.

As shown in FIG. 8A, a circular disc 25 is press fitted on a shaft 24 as each rotational center of the hinge member 6, and a cut out is provided in the circular disc 25. A photosensor 26 is provided is such a manner that it moves along the periphery of the disc 25 in response to the pivot movement of the first or second member 3 or 5. The photosensor 26 has a light emitting portion and a light receiving portion, and supplies a light detecting signal to the information processing unit 4b when the light receiving portion receives light emitted from the light emitting portion. Light emitted from the light emitting portion is usually prevented from entering into the light receiving portion by the disc 25, and can enter into the light receiving portion only when the cut out portion of the disc 25 corresponds to the photosensor 26, so that the light receiving signal is supplied from the photosensor 26 to the information processing unit 4b.

Four angle detectors 6a, 6b, 6c, and 6d each structured as described above are provided in the hinge member 6, and the two angle detectors 6a ad 6b are used to detect the 180° open position of the first and second members 3, 5 and the remaining two angle detectors 6c and 6d are used to detect the 360° open position thereof.

Action of each angle detector 6a, 6b, 6c, and 6d will be explained with reference to FIGS. 8B to 8D. In FIGS. 8B to 8D, a portion draw by a dot line is the cut out portion of each of the angle detectors 6c, 6d for detecting the 360° open position. FIG. 8B shows the portable position where the first member 3 and the second member 5 are closed to face the screen of the liquid crystal display unit 2 and the plurality of keys of the key board 4 to each other. In this portable position, the disc 25 shuts off the corresponding photosensor 26 not to supply the light detecting signal. When the first and second members 3 and 5 are pivoted apart from each other by 180°, as shown in FIG. 8C, the photosensor 26 corresponds to the cut out portion of the disc 25 of the corresponding angle detector 6a or 6b for the 180° open position so that the photosensor 26 of each of the angle detectors 6a and 6b supplies the light detecting signal to the information processing unit 4b and the subnotebook size personal computer provided with the angle detectors 6a, 6b is set in the photographing mode. When the first and second members 3 and 5 are pivoted apart from each other 360°, as shown in FIG. 8D, the photosensor 26 corresponds to the cut out portion (drawn by the dot line) of the disc 25 of the corresponding angle detector 6c or 6d for the 360° open position so that the photosensor 26 of each of the angle detectors 6c, 6d supplies the light detecting signal to the information processing unit 4b and the subnotebook size personal computer provided with the angle detectors 6c, 6d is set in the photographing mode.

Figure 9A:
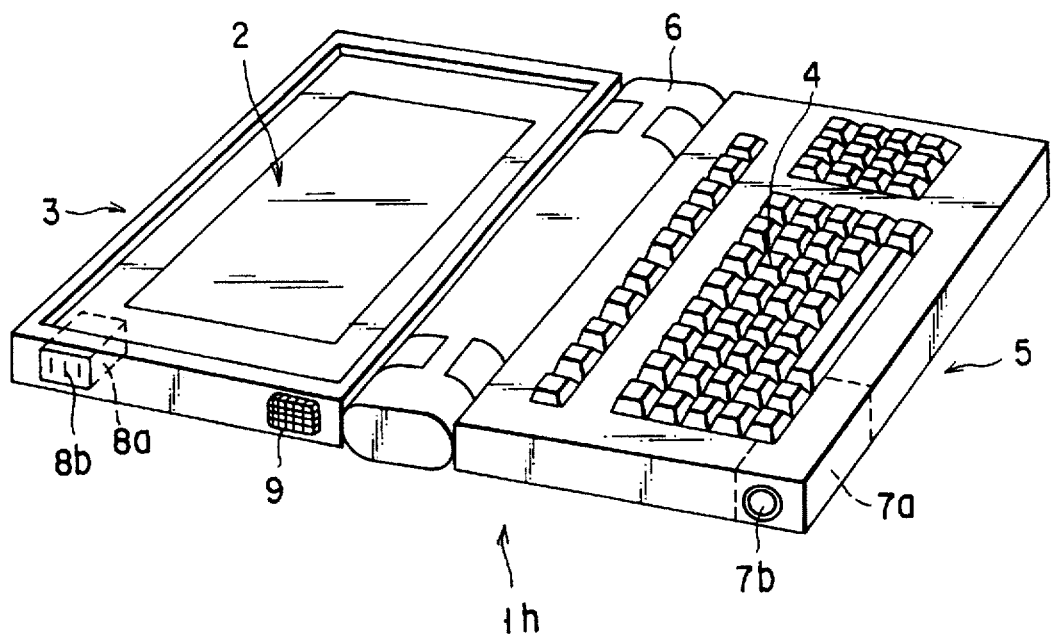
FIG. 9A is a perspective view showing still another embodiment of the portable information processing apparatus shown of this invention, in a state that its first and second members are arranged at a 180°-open position.
Figure 9B:
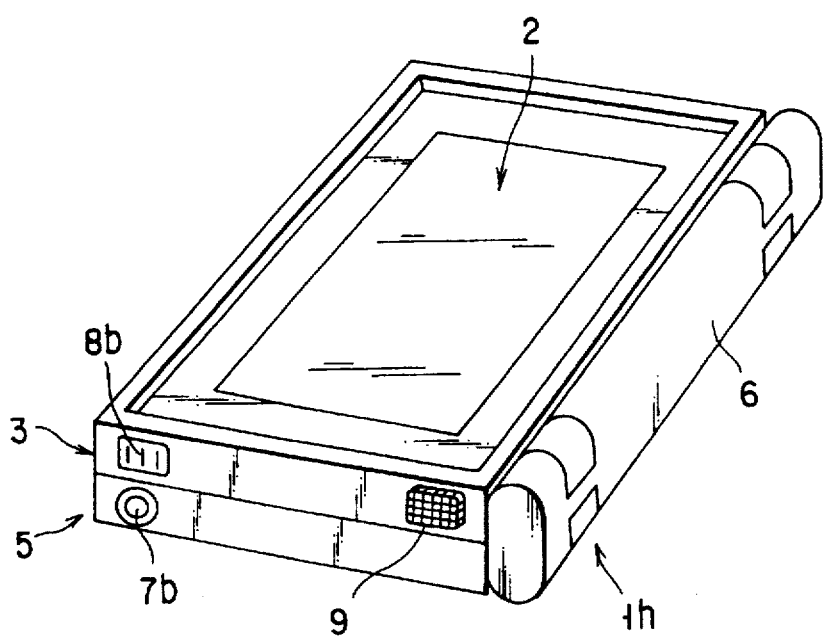
FIG. 9B is a perspective view showing the embodiment shown in FIG. 9A in a state that its first and second members are arranged at a 360°-open position.

FIGS. 9A and 9B are perspective views schematically showing the two states of a subnotebook size personal computer as still another embodiment of the portable information processing apparatus of the present invention.

The main arrangement of this invention is identical to the arrangement of the embodiment shown in FIGS. 2 and 3. Thus, the structural members of this embodiment identical to those of the embodiment shown in FIGS. 2 and 3 are denoted by the same reference numerals as those denoting the corresponding structural members of the embodiment of FIGS. 2 and 3, and a detailed description of these structural members will be omitted.

In a subnotebook size personal computer 1h of this embodiment, the photographing unit 7a which is provided in the hinge member 6 in the embodiment of FIGS. 2 and 3, is incorporated in the second member 5, as shown in FIG. 1B, and the lens 7b of the photographic optical system of the photographing unit 7a is arranged on one longitudinal end surface of the second member 5 facing in the direction along the rotation center line of the hinge member 6 at a position being far away from the hinge member 6. The microphone 9 is arranged on one longitudinal end surface of the first member 3 facing in the same direction as the one longitudinal end surface of the second member 5 at a position being close to the hinge member 6.

When the subnotebook size personal computer 1h of this modification is carried or is not used, the first member 3 and the second member 5 are arranged at the portable position where they are closed to overlap each other such that the screen of the liquid crystal display unit 2 of the first member 3 and the plurality of keys of the keyboard 4 of the second member 5 oppose each other. At this time, the lens barrier (not shown) described above covers the lens 7b.

When the subnotebook size personal computer 1h is used in the normal mode in which the computer 1h does not use image information sent from the photographing unit 7a, the first member 3 and the second member 5 are pivoted apart from each other within a range between 90° or more and less than 180° (excluding 180°) to expose the screen of the liquid crystal display unit 2 and the plurality of keys of the keyboard 4 simultaneously.

When the subnotebook size personal computer 1h is used in the normal mode, the lens barrier (not shown) covers the lens 7b.

In this embodiment, as in the embodiment described above with reference to FIGS. 2 and 3, the subnotebook size personal computer 1h is automatically set in the photographic mode when the first member 3 and the second member 5 are arranged at a 180°-open position where they are pivoted for 180° with respect to each other and when they are arranged at a 360°-open position where they are pivoted for 360° with respect to each other. In this case, as in the embodiment shown in FIGS. 2 and 3, various processing operations of the photographic mode are executed by using the viewfinder 2a and the touch operation panel 2b displayed on the screen of the liquid crystal display unit 2.

Technical advantages similar to those of the embodiment of FIGS. 2 and 3 can also be obtained in this embodiment.

In this embodiment, while the first member 3 and the second member 5 are arranged at the 180°-open position where they are pivoted for 180° with respect to each other, as shown in FIG. 9A, when the subnotebook size personal computer 1h is set in the photographic mode, the electronic flash 8a of the first member 3 is far away from the lens 7b of the photographic optical system (not shown) of the photographing unit 7a of the second member 5. Therefore, even if the electronic flash 8a emits light in this state to photograph a person, a so-called "pink-eye effect" in which the pupils of human eyes are undesirably photographed in pink can be effectively prevented.

When the subnotebook size personal computer 1h is set in the photographic mode with its first member 3 and the second member 5 being at the 360°-open position where they are pivoted for 360° with respect to each other, as shown in FIG. 9B, the electronic flash 8a of the first member 3 is close to the lens 7b of the photographic optical system (not shown) of the photographing unit 7a of the second member 5. When the electronic flash 8a is caused to emit light in this state to photograph a person, the electronic flash 8a is caused to emit light several times with a small amount of light immediately before photographing the person, thereby effectively preventing the "pink-eye effect". In addition, closeup photographing is enabled.

In this embodiment, in order to prevent an image, which is displayed on the viewfinder 2a of the liquid crystal display unit 2 in FIG. 9B, from becoming an image which is obtained by vertically and horizontally inverting the erecting image displayed on the viewfinder 2a of the liquid crystal display unit 2 in FIG. 9A, an image identical to the erecting image displayed on the viewfinder 2a of the liquid crystal display unit 2 in FIG. 9A can be displayed on the viewfinder 2a of the liquid crystal display unit 2 in FIG. 9B by electrically processing the image signal of the image photographed by the photographing unit 7a.

In this embodiment, when the information processing unit 4b incorporated in the second member 5, as shown in FIG. 1B, in the embodiment of FIG. 1A, is incorporated in the first member 3 provided with the liquid crystal display unit 2, the position of the electronic flash 8a of the first member 3 and the position of the lens 7b of the photographic optical system of the photographing unit 7a of the second member 5 can be exchanged. In this case, in order to effectively prevent noise generated upon driving the photographic optical system of the photographing unit 7a from being picked up by the microphone 9, it is preferable that the microphone 9 is arranged on the longitudinal end surface of the second member 5 provided with the electronic flash 8a, at a position which is close to the hinge member 6.

Figure 10A:
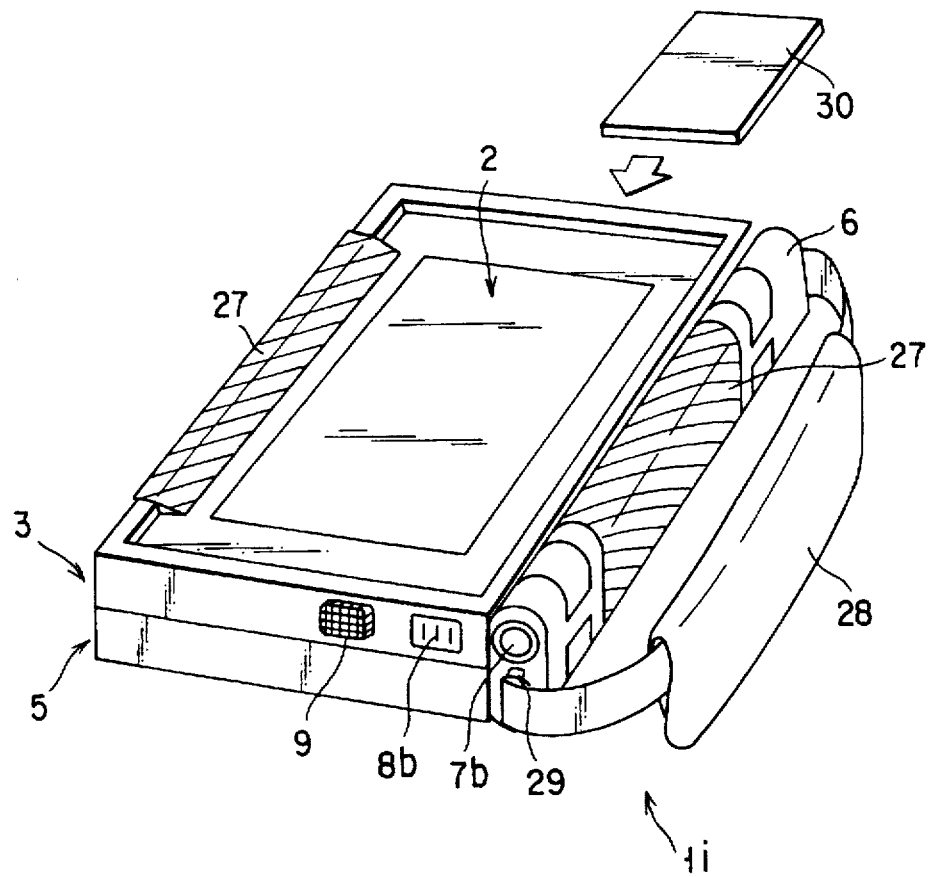
FIG. 10A is a perspective view showing the outer appearance of still another embodiment of the portable information processing apparatus of this embodiment.
Figure 10B:
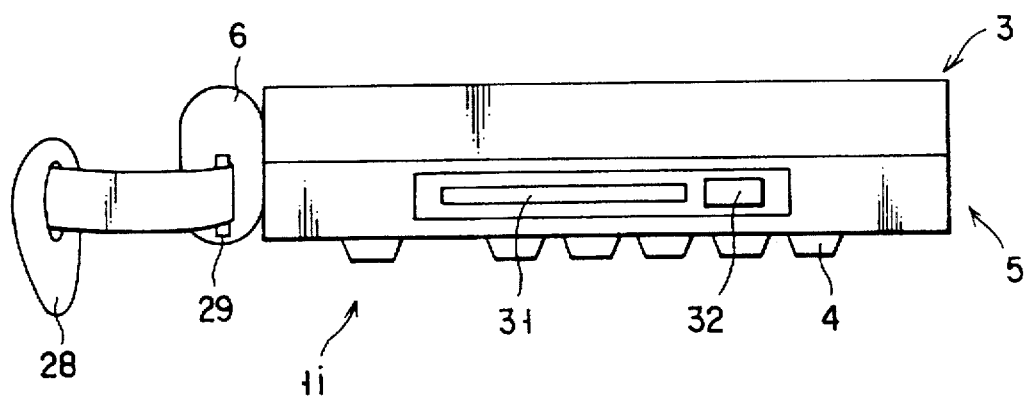
FIG. 10B is a rear view showing an information storage medium port in the rear end surface of the second member of the embodiment shown in FIG. 10A, where a keyboard is provided in the second member.

FIGS. 10A and 10B are perspective and rear views, respectively, schematically showing the outer appearance of a subnotebook size personal computer as still another embodiment of the portable information processing apparatus of the present invention.

The main arrangement of this invention is identical to the arrangement of the embodiment shown in FIGS. 2 and 3. Thus, the structural members of this embodiment identical to those of the embodiment of FIGS. 2 and 3 are denoted by the same reference numerals as those denoting the corresponding structural members of the embodiment of FIGS. 2 and 3, and a detailed description of these structural members will be omitted.

In a subnotebook size personal computer 1i of this embodiment, in order to allow the user of the subnotebook size personal computer 1i to easily hold it with his or her own hands while the subnotebook size personal computer 1i is set in the photographic mode with the first member 3 and the second member 5 of the subnotebook size personal computer 1i being arranged at a 360°-open position where they are pivoted by 360° with respect to each other and are, as shown in FIG. 10A, grips 27 made of a material having an appropriate friction are provided to cover one lateral end surface, which is far from the hinge member 6, of each of the first member 3 and the second member 5, and one lateral end surface of the hinge member 6 which faces outside in the above state. The grips 27 have such a shape to fit the fingers of the hands of the user who holds the grips 27. And, the grip 27 on the hinge member 6 constitutes a first holding member, and grips 27 on the first and second members 3, 5 constitute second and third holding members.

Strap attaching members 29 to which the both end portions of a strap 28 are detachably connected are provided to the both longitudinal end surfaces of the hinge member 6 in a direction along the rotation center lines of the first member 3 and the second member 5.

Since not only the grips 27 are employed but also the both end portions of the strap 28 are detachably connected to the pair of strap attaching members 29, when the subnotebook size personal computer 1i is used in the photographic mode in the state described above, the user of the subnotebook size personal computer 1i can stably hold the subnotebook size personal computer 1i with his or her hands, so that a high-quality image having little blur can be recorded.

In the subnotebook size personal computer 1i of this embodiment, a PC card Insertion hole 31 in which a PC card (Personal Computer Card) 30 is detachably inserted and a PC card eject button 32 for ejecting the PC card 30 inserted in the PC card insertion hole 31 are provided to the other longitudinal end surface of the second member 5 opposite to the one longitudinal end surface of the first member 3 provided with the microphone 9 and the electronic flash 8a, as shown in FIG. 10A.

The combination of the PC card insertion hole 31 and the PC card eject button 32 is applicable to all the embodiments, described above.

Figure 11:
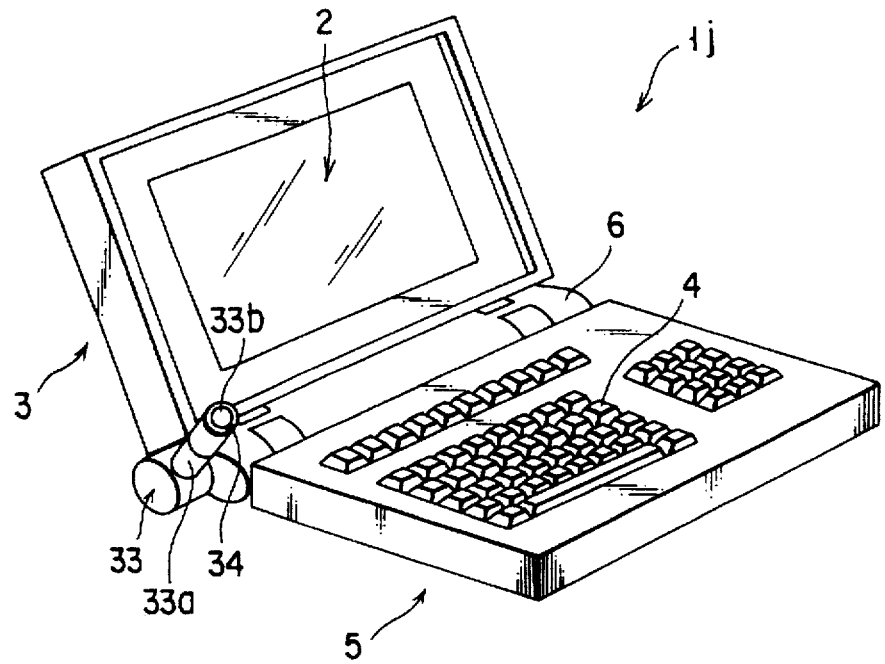
FIG. 11 is a perspective view showing the outer appearance of a portable information processing apparatus according to still another embodiment of the present invention.

FIG. 11 is a perspective view schematically showing a subnotebook size personal computer as still another embodiment of the portable information processing apparatus according to the present invention.

The main arrangement of this embodiment is identical to the arrangement of the embodiment of FIGS. 1A to 1C. Thus, the structural members of this embodiment identical to those of the embodiment of FIGS. 1A to 1C are denoted by the same reference numerals as those denoting the corresponding structural members of the embodiment of FIGS. 1A to 1C, and a detailed description of these structural members will be omitted.

In a subnotebook size personal computer 1j of this embodiment, a mirror optical system 33 which forms a desired optical path by utilizing a combination of a plurality of mirrors is added to the photographic optical system (not shown) of the photographing unit 7a (see FIG. 1B) of the hinge member 6. The mirror optical system 33 directs the optical path of the photographic optical system, which almost extends in the hinge member 6 in the direction of the pair of rotation center lines of the hinge member 6, in a direction substantially perpendicular to the rotation center lines in outside of the hinge member 6. The mirror optical system 33 is housed in an optics housing member 33a which is pivotal about its base attached to the hinge member 6. A microphone 34 and a transparent cover 33b which cover the port of the mirror optical system 33 are arranged at the extending end of the optics housing member 33a.

When the subnotebook size personal computer 1j of this embodiment is used, the outer side surface of the second member 5 in which the plurality of keys of the keyboard 4 is not exposed is placed on the flat surface, e.g., a desktop, and the first member 3 having the liquid crystal display unit 2 is pivoted apart from the second member 5 through the hinge member 6 within a range between about 90° and about 180° (including 180°).

The subnotebook size personal computer 1j of this embodiment can be selectively set in the normal mode in which the computer 1j does not use image information sent from the photographing unit 7a and the photographic mode in which the computer 1j uses image information sent from the photographing unit 7a in accordance with a key operation of the keyboard 4 in a predetermined manner.

When the subnotebook size personal computer 1j is set in the photographic mode, the extending end of the optics housing member 33a is directed toward the user (not shown) facing the subnotebook size personal computer 1j, as shown in FIG. 11. Then, the image of the user can be displayed on the screen of the liquid crystal display unit 2. When the keyboard 4 is operated while the subnotebook size personal computer 1j is set in the photographic mode, in the same manner as in the embodiment described above with reference to FIGS. 1A to 1C, the image (including not only an image currently being photographed through the mirror optical system 33 but also an image stored in an information storage unit 4c (see FIG. 1B) of the subnotebook size personal computer 1j and reproduced on the screen of the liquid crystal display unit 2) displayed on the screen of the liquid crystal display unit 2 can be processed by various types of processing programs.

In this embodiment, when the subnotebook size personal computer 1j is connected to the telephone line and is used in combination with a telephone set, the subnotebook size personal computer 1j can also be used as the image display of a picture telephone.

Figure 12:
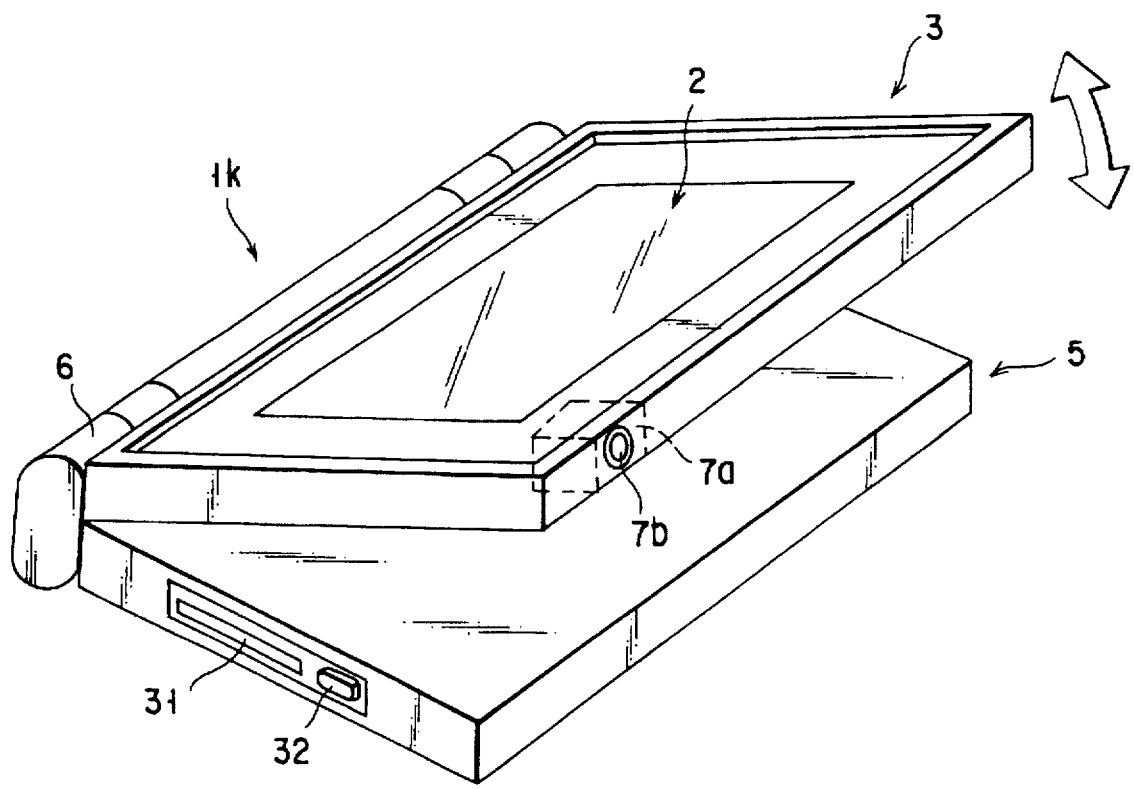
FIG. 12 is a perspective view showing the outer appearance of a portable information processing apparatus according to a third embodiment of the present invention.

FIG. 12 is a perspective view schematically showing a subnotebook size personal computer as still another embodiment of the portable information processing apparatus of the present invention.

The main arrangement of this embodiment is identical to the arrangement of the embodiment of FIGS. 1A to 1C. Thus, the structural members of this embodiment identical to those of the embodiment of FIGS. 1A to 1C are denoted by the same reference numerals as those denoting the corresponding members of the embodiment of FIGS. 1A to 1C, and a detailed description of these structural members will be omitted.

In a subnotebook size personal computer 1k of this embodiment, the photographing unit 7a, which is provided to the hinge member 6 in the embodiment of FIGS. 1A to 1C, as shown in FIG. 1B, is incorporated in the first member 3 having the liquid crystal display unit 2. The lens 7b of the photographic optical system of the photographing unit 7a is arranged on the other lateral end surface of the first member 3 opposite to one lateral end surface thereof connected to the hinge member 6. The lens 7b is combined with a lens barrier (not shown) which is opened and closed selectively.

When the subnotebook size personal computer 1k of this embodiment is not used, the first member 3 and a second member 5 are arranged at the portable position where they are closed to overlap each other such that the screen of the liquid crystal display unit 2 of the first member 3 and the plurality of keys of the keyboard 4 (see FIG. 1A) of the second member 5 oppose each other. At this time, the lens barrier (not shown) covers the lens 7b.

When the subnotebook size personal computer 1k is used in the normal mode in which the computer 1k does not use an image photographed by the photographing unit 7a, the first member 3 and the second member 5 are pivoted apart from each other within a range between 90° or more and 180° and less (including 180°) to expose the screen of the liquid crystal display unit 2 and the plurality of keys of the keyboard 4 simultaneously. Then, the subnotebook size personal computer 1k is set in the normal mode by operating the keyboard 4.

When the subnotebook size personal computer 1k is used in the normal mode, the lens barrier (not shown) covers the lens 7b.

After the subnotebook size personal computer 1k is set in the normal mode, when the keyboard 4 (see FIG. 1A) is further operated, the various types of processing programs of the normal mode can be executed.

In the subnotebook size personal computer 1k of this embodiment, the subnotebook size personal computer 1k can be set in the photographic mode by operating the keyboard 4. In setting the subnotebook size personal computer 1k in the photographic mode, the first member 3 and the second member 5 are pivoted apart from each other within a range between about 90° and 360° so that an image displayed on the screen of the liquid crystal display unit 2 of the first member 3 can be observed. Then, the subnotebook size personal computer 1k is placed on a flat surface, e.g., a desktop, such that the screen of the liquid crystal display unit 2 faces upward, as shown in FIG. 12, or is held by the user's hand.

When the subnotebook size personal computer 1k is set in the photographic mode, the lens barrier (not shown) exposes the lens 7b.

The user can change the photographing direction of the lens 7b by changing the pivot angle of the first member 3 with respect to the second member 5. In the same manner as in the embodiment of FIGS. 1A to 1C, when the user operates the keyboard 4 while the subnotebook size personal computer 1k is set in the photographic mode, the image (including not only an image currently being photographed through the lens 7b but also an image stored in the information storage unit 4c (see FIG. 1B) of the subnotebook size personal computer 1k and reproduced on the liquid crystal display unit 2) displayed on the liquid crystal display unit 2 can be processed by various types of processing programs.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable information processing apparatus comprising:

a first member provided with an information display unit, said first member having an outer surface for exposing the information display unit;

a second member provided with an information input unit, said second member having an outer surface for exposing the information input unit;

a hinge member pivotally connecting said first and second members with each other so that said first and second members are pivotable between: (i) a portable position in which said first and second members overlap each such that the outer surface of said first member and the outer surface of said second member oppose each other, and (ii) an open position in which the outer surface of said first member and the outer surface of said second member are moved away from each other so as to separate said first and second members from each other;

an angle detector for detecting at least one of an angle of substantially 180° and 360° between said first and second members while said first and second members are rotated in the open position; and a photographing unit which is enabled to perform a photographing operation when said angle detector detects at least one of the angle of substantially 180° and 360° between said first and second members;

wherein said information display unit provided in said first member includes a display for displaying photographic image information obtained by said photographing unit, and wherein said information input unit provided in said second member includes at least one of: (i) a photographic conditions setting device for setting various photographing conditions of said photographing unit, and (ii) a shutter release device for controlling a shutter of said photographing unit.

2. An apparatus according to claim 1, wherein said photographing unit is provided in said hinge member.

3. An apparatus according to claim 2, wherein one of said first member and said second member is provided with a microphone for inputting sound information corresponding to said photographic image information obtained by said photographing unit.

4. An apparatus according to claim 2, wherein said first member is provided with an electronic flash which is operable together with said photographing unit, and said second member is provided with an information processing unit for processing said photographic image information obtained by said photographing unit.

5. An apparatus according to claim 2, wherein said first member is provided with an information processing unit for processing said photographic image information obtained by said photographing unit, and said second member is provided with an electronic flash which is operable together with said photographing unit.

6. An apparatus according to claim 1, wherein the photographing unit is provided in said first member.

7. An apparatus according to claim 6, wherein said second member is provided with a microphone for inputting sound information corresponding to said photographic image information obtained by said photographing unit.

8. An apparatus according to claim 6, wherein:

said second member is provided with an electronic flash which is operable together with said photographing unit, the photographing unit and the electronic flash are closest to each other when said first and second members are located at one of the portable position and the open position in which the angle between said first and second members is 360°, and the photographing unit and the electronic flash are most moved away from each other when said first and second members are located at the open position in which the angle between said first and second members is 180°.

9. An apparatus according to claim 8, wherein said first member is provided with an information processing unit for processing said photographic image information obtained by said photographing unit.

10. An apparatus according to claim 6, wherein the photographing unit is provided in said first member such that the photographing unit is exposed at an end surface of said first member which is located opposite to a connecting portion of said first member to said hinge member.

11. An apparatus according to claim 1, wherein said photographing unit is provided in said second member.

12. An apparatus according to claim 11, wherein said second member is provided with a microphone for inputting sound information corresponding to said photographic image information obtained by said photographing unit.

13. An apparatus according to claim 11, wherein:

said first member is provided with an electronic flash which is operable together with said photographing unit, the photographing unit and the electronic flash are closest to each other when said first and second members are located at one of the portable position and the open position in which the angle between said first and second members is 360°, and the photographing unit and the electronic flash are most moved away from each other when said first and second members are located at the open position in which the angle between said first and second members is 180°.

14. An apparatus according to claim 13, wherein said second member is provided with an information processing unit for processing said photographic image information obtained by said photographing unit.

15. An apparatus according to claim 1, wherein said second member is provided with an information storage unit for storing said photographic image information obtained by said photographing unit.

16. An apparatus according to claim 15, wherein the information storage unit is provided with an information storage medium port through which an independent information storage medium can be inserted into the information storage unit and removed therefrom.

17. An apparatus according to claim 1, wherein said hinge member is provided with a first holding member which enables said apparatus to be easily held in a palm of a user when the photographing unit is enabled to perform a photographing operation.

18. An apparatus according to claim 17, wherein said first holding member is shaped to increase friction between a user's fingers and the first holding member when the user holds said information processing apparatus with their fingers.

19. An apparatus according to claim 17, wherein said first holding member includes a palm-held strap which prevents the palm of the user from being moved away from the outer surface of said information processing apparatus when the user holds said apparatus with their fingers.

20. An apparatus according to claim 1, wherein said first member is provided with a second holding member which enables said apparatus to be easily held in a hand of a user when the photographing unit is enabled to perform a photographing operation.

21. An apparatus according to claim 1, wherein said second member is provided with a third holding member which enables said apparatus to be easily held in a hand of a user when the photographing unit is enabled to perform a photographing operation.

22. A portable information processing apparatus comprising:

a first member provided with an information display unit, said first member having an outer surface for exposing the information display unit;

a second member provided with an information input unit, said second member having an outer surface for exposing the information input unit;

a hinge member pivotally connecting said first and second members with each other so that said first and second members are pivotable between: (i) a portable position in which said first and second members overlap each such that the outer surface of said first member and the outer surface of said second member oppose each other, and (ii) an open position in which the outer surface of said first member and the outer surface of said second member are moved away from each other so as to separate said first and second members from each other;

a photographing unit for performing a photographing operation, said photographing unit being mounted in said hinge member; and an optical extending member optically connected to the photographing unit, said optical extending member projecting from said hinge member in a direction crossing rotational outer lines between said hinge member and said first and second members, and including means for orienting an optical axis of said photographing unit in a given direction;

wherein said information display unit provided in said first member includes a display for displaying photographic image information obtained by said photographing unit, and wherein said information input unit provided in said second member includes at least one of: (i) a photographic conditions setting device for setting various photographing conditions of said photographing unit, and (ii) a shutter release device for controlling a shutter of said photographing unit.

23. An apparatus according to claim 22, wherein said optical extending member is provided at its extending end with a microphone for inputting sound information corresponding to said photographic image information obtained by said photographing unit.

* * * * *